(12) United States Patent
Azuma et al.

(10) Patent No.: US 7,473,225 B2
(45) Date of Patent: Jan. 6, 2009

(54) ULTRASONIC IMAGING SYSTEM AND METHOD

(75) Inventors: Takashi Azuma, Kawasaki (JP); Shin-ichiro Umemura, Hachiouji (JP); Yuichi Miwa, North Bethesda, MD (US)

(73) Assignee: Hitachi Medical Corporation, Tokyo (JP)

( * ) Notice: Subject to any disclaimer, the term of this patent is extended or adjusted under 35 U.S.C. 154(b) by 1035 days.

(21) Appl. No.: 10/618,750

(22) Filed: Jul. 15, 2003

(65) Prior Publication Data

US 2004/0059221 A1 Mar. 25, 2004

(30) Foreign Application Priority Data

Sep. 25, 2002 (JP) .............................. 2002-279413

(51) Int. Cl.
*A61B 8/00* (2006.01)
(52) U.S. Cl. ....................................... 600/442; 600/437
(58) Field of Classification Search ................. 600/455, 600/442, 437
See application file for complete search history.

(56) References Cited

U.S. PATENT DOCUMENTS 5,331,964 A * 7/1994 Trahey et al. ............... 600/447
5,531,117 A * 7/1996 Fortes .......................... 73/602
5,865,751 A * 2/1999 Okuno et al. ............... 600/443
2002/0002333 A1* 1/2002 Angelsen et al. ............ 600/443

* cited by examiner

*Primary Examiner*—Brian L. Casler
*Assistant Examiner*—Jacqueline Cheng
(74) *Attorney, Agent, or Firm*—Antonelli, Terry, Stout & Kraus, LLP.

(57) ABSTRACT

There are provided an ultrasonic imaging system and method which can correct a phase shift effect to image a real change in acoustic impedance in a living body.

An ultrasonic probe transmits an ultrasonic beam to an object to receive an echo. A transmit beamformer transmits a transmit signal via transmit/receive SWs to the probe in delay time matched with a transmit focal point according to the signal under the control of a control system. An ultrasonic signal returned from the object to the probe is converted to an electric signal by the probe to be transmitted via the transmit/receive SWs to a complex receive beamformer. The complex receive beamformer performs dynamic focus adjusting delay time according to reception timing. A phase shift correction part uses the output of the complex beamformer outputting beams of a real part and an imaginary part to correct phase shift. due to frequency-dependent attenuation, correct phase shift in the lateral direction of the beam, or correct both. After phase shift correction, an acoustic impedance change amount operation part obtains a derivative about the space position of acoustic impedance. The signal subject to filtering processing is image displayed via a scan converter on a display part.

24 Claims, 20 Drawing Sheets

PHASE SHIFT CAUSED BY TISSUE ATTENUATION

ECHO SIGNAL NOT AFFECTED BY PHASE SHIFT

DIRECTION OF ECHO PROPAGATION

ULTRASONIC IMAGING SYSTEM AND METHOD

BACKGROUND OF THE INVENTION

The present invention relates to an ultrasonic imaging system and method which image an image in an object using ultrasonic waves.

An ultrasonic imaging system used in medical imaging diagnosis can display and observe a tomographic image of the tissue of a soft part of a living body and an image of the blood flow flowed in a living body in substantially real time on a monitor using a pulse echo method. The ultrasonic imaging system also gives no radiation exposure of an imaging diagnostic system using radiation to an object, which offers high safety. Further, it is small and inexpensive. It is used widely in a medical field.

The imaging mechanism of a prior art ultrasonic imaging system will be described as follows. The ultrasonic imaging system transmits an ultrasonic wave from an ultrasonic probe having an array of piezoelectric materials to an object. Timing transmitting the ultrasonic wave from the devices of the array is controlled. The focal point position of the ultrasonic wave in the object is controlled. A signal which has been received by each of the devices of the array is added by shifting time according to a distance difference between a desired position and the position of each of the devices to strengthen a signal from the desired position. An ultrasonic pulse is scanned over the entire imaging region to acquire a tomographic image. In the prior art, in such pulse echo method, an echo (receive signal) from an interface in which acoustic impedance in an object is changed is received to envelope detect the receive signal so as to use an absolute value of the echo for imaging a tomographic image.

Prior art about trials to perform imaging while the code of an echo remains or using phase information is proposed (for example, see Japanese Patent Application Laid-Open No. 55-136043 and Japanese Patent Application Laid-Open No. 11-137546).

In the prior art methods, when using code information of an echo (receive signal), phase shift of an echo signal due to a change in acoustic impedance cannot be discriminated from phase shift of an echo signal due to other factors. It is difficult to image an acoustic impedance map of a real object.

The above-described other factors are the following two factors (1) and (2).

(1) Since the center frequency of an ultrasonic pulse is changed by attenuation in a living body, an apparent phase is shifted. (2) Due to phase shift in the lateral direction of an ultrasonic beam, a signal from a noted echoing object near the ultrasonic beam is received as a phase shift signal.

A first object in such prior art methods is to correct a phase shift effect of a receive signal of (1) and (2) to image a real change in acoustic impedance in a living body.

A second object is an object about monitoring the treating effect of a coagulation therapy described below. The coagulation therapy is a method for thermally treating the affected part of prostatomegaly, prostatic cancer or liver cancer by irradiating strong focusing ultrasonic waves or irradiating electromagnetic waves such as RF waves or microwaves. The above-described phase information imaging is expected to accelerate development of a minimally invasive therapy using coagulation which has been developed in recent years.

In these therapies, treatment can be conducted without making a large incision on the surface of a body. Their clinical use has been enlarged, which makes an effect decision method important. When there is a treating leak of cancer, the cancer grows therefrom. It is important to decide whether a part to be treated has been completely treated. At present, contrast CT, contrast MRI, and contrast ultrasonic wave methods are used. It is difficult to perform imaging in the CT or MRI during treatment. Since a contrast agent is used, treatment is stopped once to perform effect decision. When it is failed, the treatment is restarted.

To conduct more effective treatment, it is desired that effect decision can be performed while conducting treatment. Distortion imaging using a pressurizing method has been studied as a tissue imaging method without using an ultrasonic contrast agent. This is considered to be applied only to a location where pressurizing can be performed effectively. From the above reasons, a simplified tissue hardness imaging method is necessary.

A third object is an object about a contrast ultrasonic wave method. The contrast ultrasonic wave method is a method for observing a time difference between the functions of a living body using a behavior injecting a contrast agent as a trigger. This can image the contrast of a difference in blood vessel system for each tissue of a liver (that is, arterial dominant for a liver cancer and portal dominant for other normal tissue parts).

In this case, it is important that a signal from a contrast agent be discriminated from a signal from the tissue of a living body for imaging. In the prior art, a contrast between echo signals from a contrast agent and the tissue of a living body is provided by a method for using a frequency change in an echo signal such as using nonlinearity of the response of a contrast agent to employ a second harmonic wave. Since the tissue of a living body also has nonlinearity, the contrast is hard to provide. Improvement in the contrast is desired.

SUMMARY OF THE INVENTION

The present invention has been made in view of the above points and an object of the present invention is to provide an ultrasonic imaging system and method which can correct a phase shift effect to image a real change in acoustic impedance in a living body.

In acoustic impedance imaging in the prior art, it is difficult to image a real change in acoustic impedance in an object since phase shift of an echo due to the change in acoustic impedance in the object, phase shift in the lateral direction of an ultrasonic beam, and phase shift due to frequency shift are mixed with each other. In the ultrasonic imaging system of the present invention, phase shift in the lateral direction of an ultrasonic beam and phase shift due to frequency shift are corrected by an imaginary second harmonic wave method or an even harmonic wave method and a least square filter. Only the change in acoustic impedance in an object can be extracted for imaging.

The ultrasonic imaging system of the present invention has means in which an ultrasonic wave is transmitted to an object to obtain a receive waveform returned from the object by the transmission, and then, from phase shift of the receive waveform referred to a transmit waveform, phase aberration of an echo due to a space change (or map) in acoustic impedance of an object is discriminated from phase aberration due to other factors; and means estimating the space change in acoustic impedance of the object. The above other factors are desirably phase shift of frequency-dependent attenuation and/or a diffraction effect.

One method for removing phase shift due to frequency-dependent attenuation has means orthogonally detecting the receive waveform to express it as a complex signal; means squaring the same; means extracting an effect other than phase shift due to a space change in acoustic impedance; means estimating phase shift due to frequency-dependent attenuation; and means removing the same.

Another method for removing phase shift due to frequency-dependent attenuation has means, as the transmit waveform, transmitting a waveform superimposed on a second harmonic wave or an even harmonic wave of a fundamental wave; and means using an orthogonal component of the received second harmonic wave to correct a phase caused in the process of propagation. In either of the methods, the present invention can have means correcting a phase shift effect due to frequency-dependent attenuation.

The present invention has means calculating phase shift in the lateral direction of a point spread function decided by transmission/reception conditions; and filtering processing means minimizing the phase shift. Phase aberration caused by phase shift due to a diffraction effect can be removed.

The present invention has means isolating phase shift of an echo signal due to a space map of an object from phase shift stacked in the process of propagation and phase shift due to a diffraction effect to extract a specific phase component from the echo signal. The present invention can have means imaging a change in acoustic impedance of an object, a space change in derivative of acoustic impedance, a resonant state, and a contrast agent map.

The present invention can be used in treatment. A treating system having an ultrasonic monitoring mechanism which images the state of an object by ultrasonic waves has means in which an ultrasonic wave is transmitted to an object to obtain a receive waveform returned from the object by the transmission, and then, from the phase shift due to frequency-dependent attenuation and/or a diffraction effect is corrected to estimate a time change in acoustic impedance of the object from phase shift of the receive waveform referred to a transmit waveform; means displaying the same; and means feeding back the result in a treated state.

An ultrasonic imaging method of the present invention is a method in which an ultrasonic wave is transmitted to an object to obtain a receive waveform returned from the object by the transmission, and then, from phase shift of the receive waveform referred to a transmit waveform, phase aberration of an echo due to a space change in acoustic impedance of the object is discriminated from phase shift of an echo due to other factors, wherein the space change (or map) in acoustic impedance of the object is estimated. The above other factors are desirably phase shift due to frequency-dependent attenuation and/or phase shift due to a diffraction effect.

As one method for removing phase shift due to frequency-dependent attenuation, the receive waveform is orthogonally detected to express it as a complex signal, the same is squared, an effect other than phase shift due to a space change in acoustic impedance is extracted, phase shift due to frequency-dependent attenuation is estimated, and the same is removed.

As another method for removing of phase shift due to frequency-dependent attenuation, a waveform superimposed on a second harmonic wave or an even harmonic wave of a fundamental wave is transmitted as the transmit waveform, and an orthogonal component of the received second harmonic wave is used to correct a phase caused in the process of propagation. In either of the methods, a phase shift effect due to frequency-dependent attenuation can be corrected.

For phase aberration caused by phase shift due to a diffraction effect, phase shift in the lateral direction of a point spread function decided by transmission/reception conditions is calculated, and then, filtering processing minimizing the phase shift is performed. The phase shift effect due to a diffraction effect can be removed.

The present invention isolates phase shift of an echo signal due to a space map of an object from phase shift stacked in the process of propagation and phase shift due to a diffraction effect to extract a specific phase component from the echo signal. The present invention can image a change in acoustic impedance of an object, a space change in derivative of acoustic impedance, a resonant state, and a contrast agent map.

DETAILED DESCRIPTION OF THE PREFERRED EMBODIMENTS

Embodiments of the present invention will be described in detail using the drawings.

Embodiment 1

Figure 1:
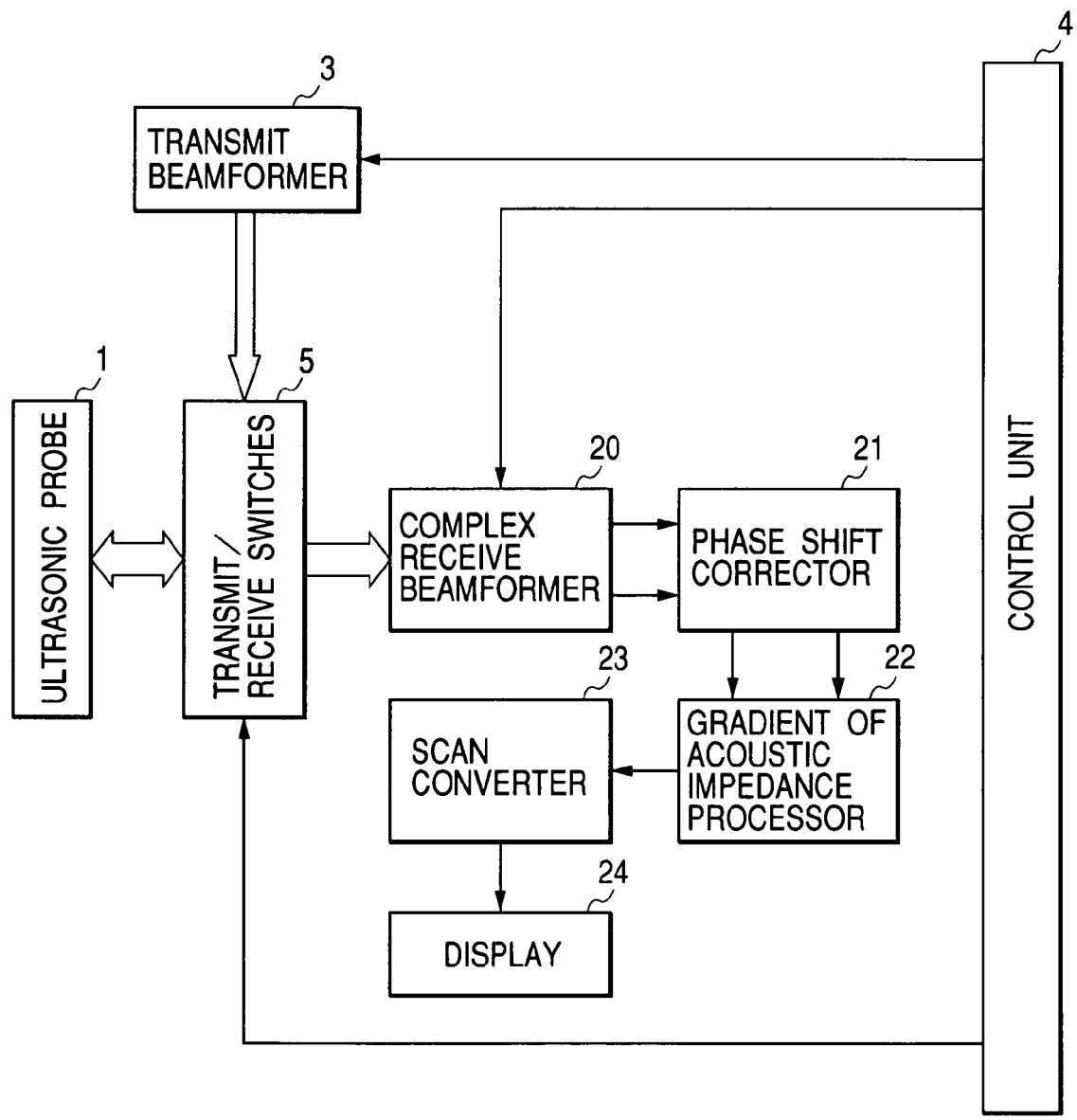
FIG. 1 is a diagram showing a construction example of an ultrasonic imaging system which acquires a derivative image of acoustic impedance in Embodiment 1 of the present invention.

FIG. 1 is a diagram showing a construction example of an ultrasonic imaging system which acquires a derivative image of acoustic impedance in Embodiment 1 of the present invention.

Figure 2:
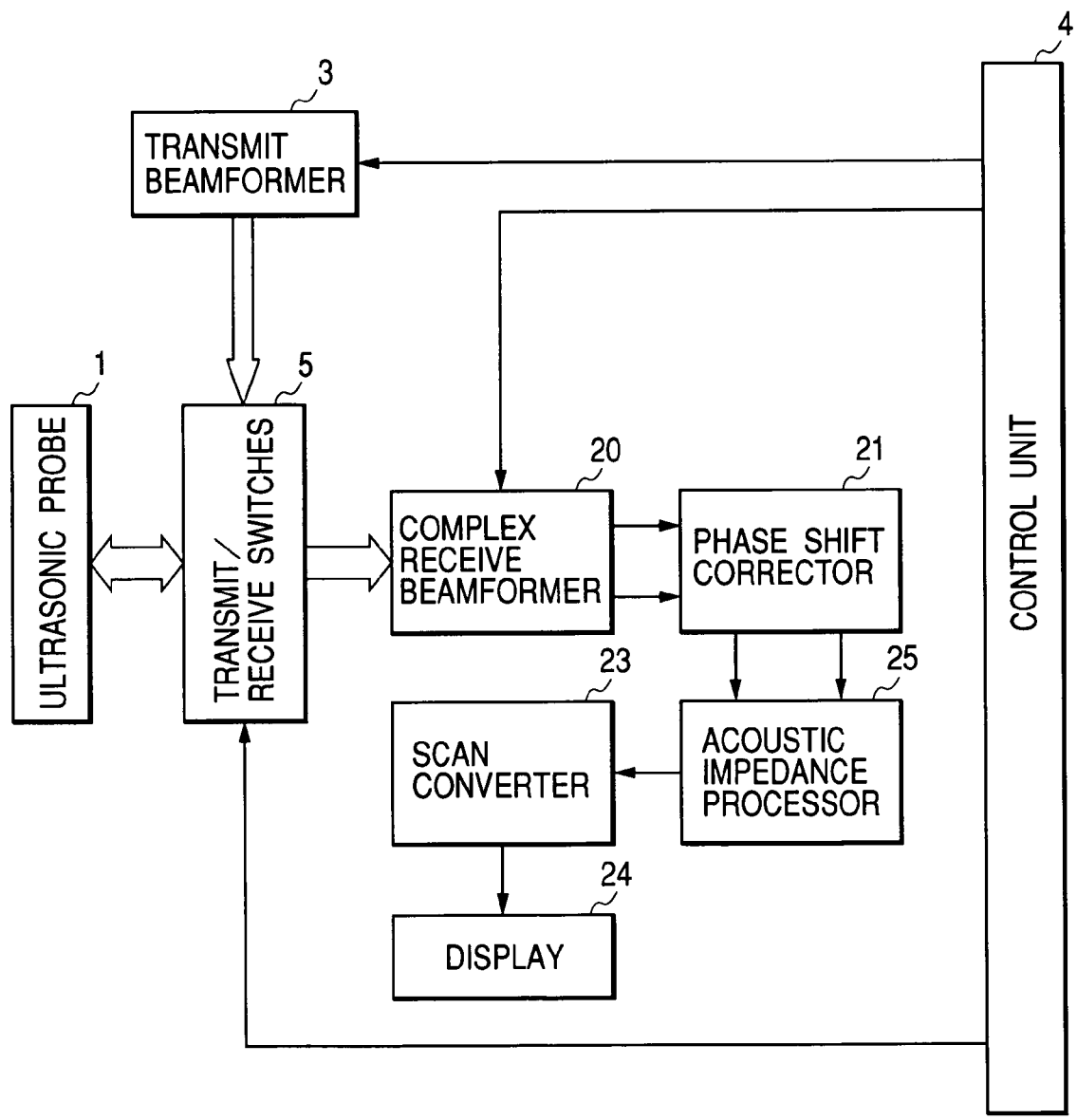
FIG. 2 is a diagram showing a construction example of an ultrasonic imaging system which acquires an acoustic impedance image in Embodiment 1 of the present invention.

FIG. 2 is a diagram showing a construction example of an ultrasonic imaging system which acquires an acoustic impedance image in Embodiment 1 of the present invention.

An ultrasonic probe 1 transmits an ultrasonic beam to an object, not shown, to receive an echo from the object. A transmit beamformer 3 transmits a transmit signal via transmit/receive SWs (switches) 5 to the ultrasonic probe 1 in delay time matched with a transmit focal point according to the signal under the control of a control system 4. The transmit/receive SWs 5 are under the control of the control system 4. An ultrasonic signal echoed or scattered in the object to be returned to the ultrasonic probe 1 is converted to an electric signal by the ultrasonic probe 1 to be transmitted via the transmit/receive SWs 5 to a complex receive beamformer 20. The complex receive beamformer 20 performs dynamic focus adjusting delay time according to reception timing under the control of the control system 4. The complex receive beamformer 20 performs mixing of two signals in which phases are shifted 90° from each other to output beams of a real part and an imaginary part. A phase shift correction part 21 uses the output signal of the complex receive beamformer 20 to correct phase shift due to frequency-dependent attenuation, correct phase shift in the lateral direction of the beam, or correct both.

After phase shift correction in the phase shift correction part 21, in the construction shown in FIG. 2, an acoustic impedance operation part 25 calculates acoustic impedance. In the construction shown in FIG. 1, an acoustic impedance change amount operation part 22 calculates a derivative about the space position of acoustic impedance. The output signals of the acoustic impedance change amount operation part 22 (FIG. 1) and the acoustic impedance operation part 25 (FIG. 2) subject to filtering processing, not shown, which has been known, are image displayed as the results via a scan converter 23 on a display part 24.

In the image display, any one of a prior art B mode image, a derivative image of acoustic impedance acquired in FIG. 1 and an acoustic impedance image acquired in FIG. 2 can be displayed, or plural images selected from these can be superimposed on each other to be displayed. For the display of the acoustic impedance image, it can be considered a method for displaying hardness in color in such a manner that a part harder than a part having average hardness is displayed in red and a soft part is displayed in blue.

The phase of an echo from a living body will be described in detail.

FIG. 3 is a diagram of assistance in explaining center frequency movement of an echo in Embodiment 1 of the present invention.

FIG. 4 is a diagram of assistance in explaining the influence of center frequency movement on the phase of an echo in Embodiment 1 of the present invention.

Figure 4A:
FIGS. 4A to 4E are diagrams of assistance in explaining the influence of center frequency movement on the phase of an echo in Embodiment 1 of the present invention.
Figure 4B:
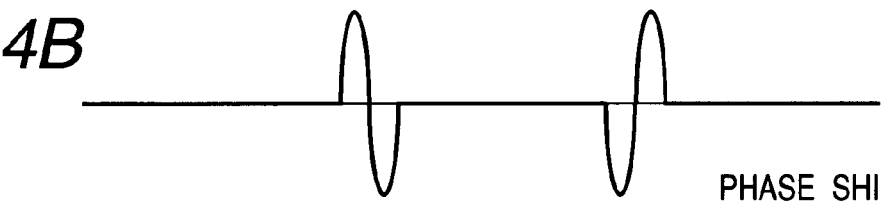

FIG. 4A is a diagram schematically showing a change in acoustic impedance. FIG. 4B shows a receive RF waveform (echo) to the change in acoustic impedance shown in FIG. 4A when there is no phase shift.

Figure 3A:
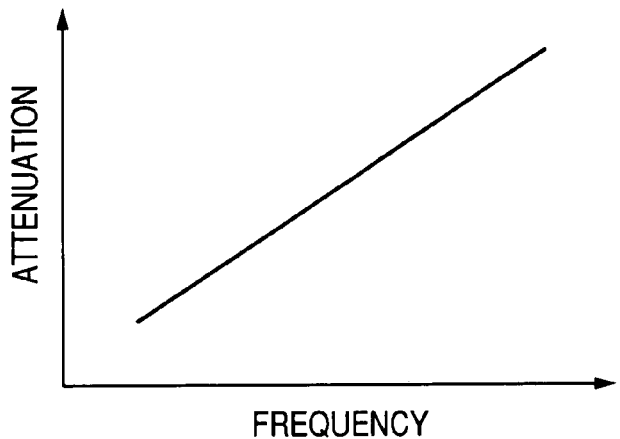
FIGS. 3A to 3B are diagrams of assistance in explaining center frequency movement of an echo in Embodiment 1 of the present invention.
Figure 3B:
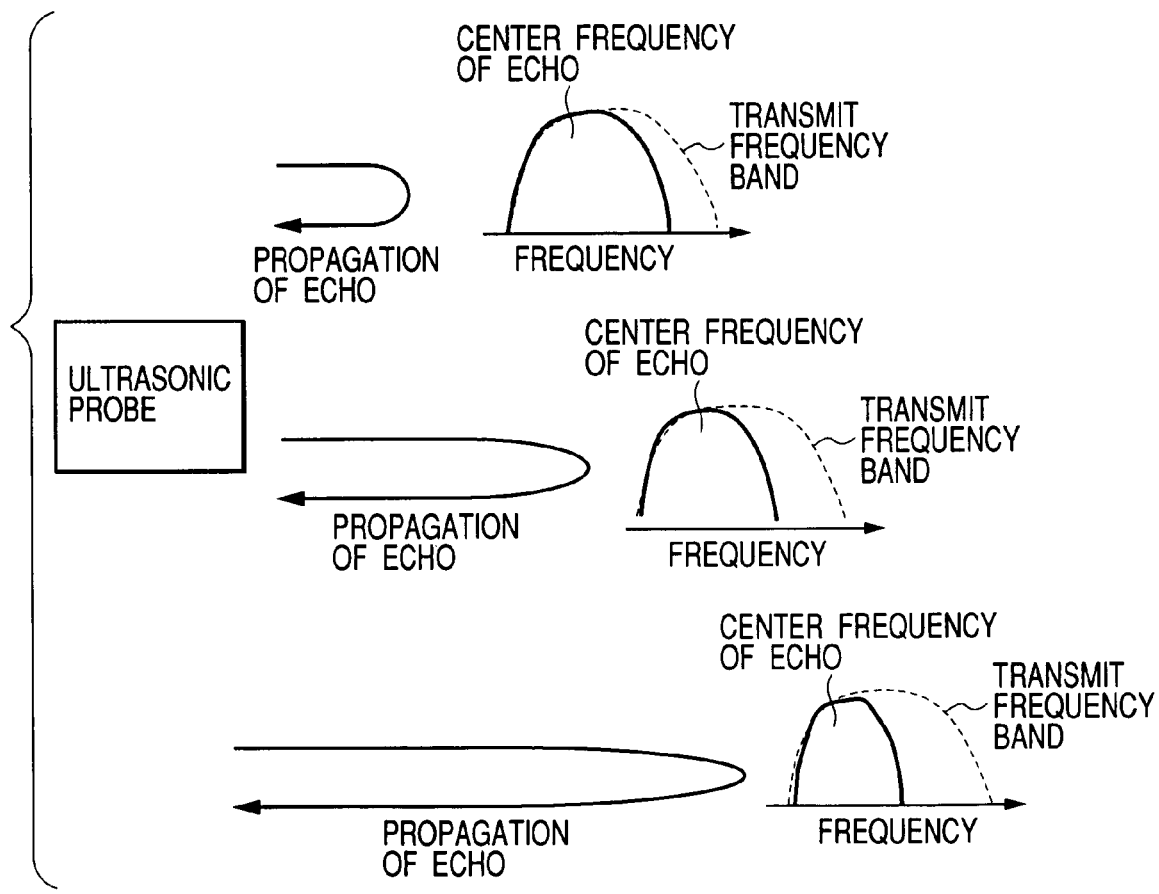

As shown in FIG. 4B, the phase of an echo is not changed at the interface changing to a hard part (large acoustic impedance) and is shifted 180° at the interface changing to a soft part (small acoustic impedance). Actually, as shown in FIG. 3A, attenuation of a living body is larger as the frequency is higher. With an echo signal from the deep part of a living body propagated a longer distance, the high-frequency component is lost. As shown in FIG. 3B (showing a change in center frequency of an echo to three echo propagation lengths to the transmit band and the probe), the center frequency of an echo signal is changed to the low-frequency side by the echo depth.

Figure 4C:
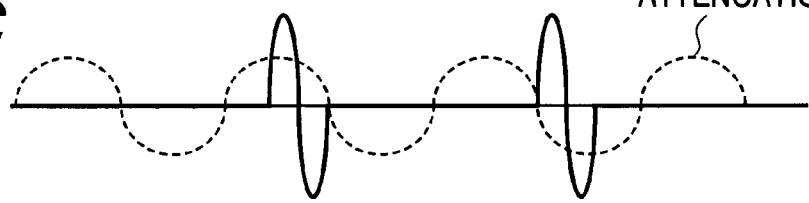

As shown in FIG. 4C, the receive RF waveform is subject to phase shift for phase shift due to attenuation of a living body. A change in center frequency of an echo signal due to attenuation of a living body gives apparent phase shift. Whether phase shift is due to a change in hardness or due to center frequency movement cannot be discriminated. When a living body is a completely homogeneous medium, center frequency movement can be corrected. Actually, the velocity of sound and an attenuation coefficient are different depending on a location. Correcting the same is not easy.

Figure 4D:
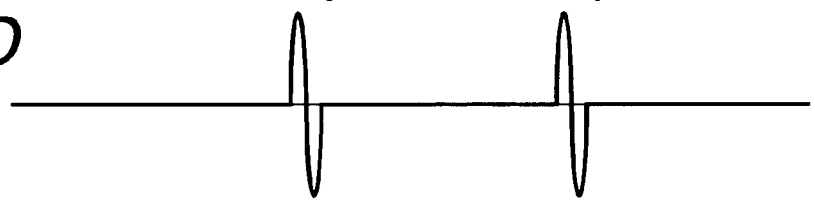
Figure 4E:
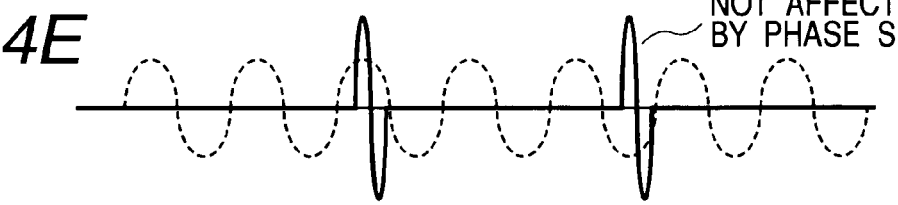

In the present invention, the center frequency movement is corrected by considering a second harmonic wave. FIG. 4D shows a receive RF waveform of a second harmonic wave to a change in acoustic impedance shown in FIG. 4A when there is no phase shift. FIG. 4E shows a receive RF waveform of a second harmonic wave to a change in acoustic impedance shown in FIG. 4A when there is phase shift. As is apparent from comparison of FIG. 4D with FIG. 4E, the receive RF waveform shown in FIG. 4E is not affected by phase shift due to hardness. Phase shift of 180° for a fundamental wave is phase shift of 360° for a second harmonic wave, which is not discriminated from phase shift of 0°. Only the phase shift effect due to center frequency movement can be observed.

Figure 5:
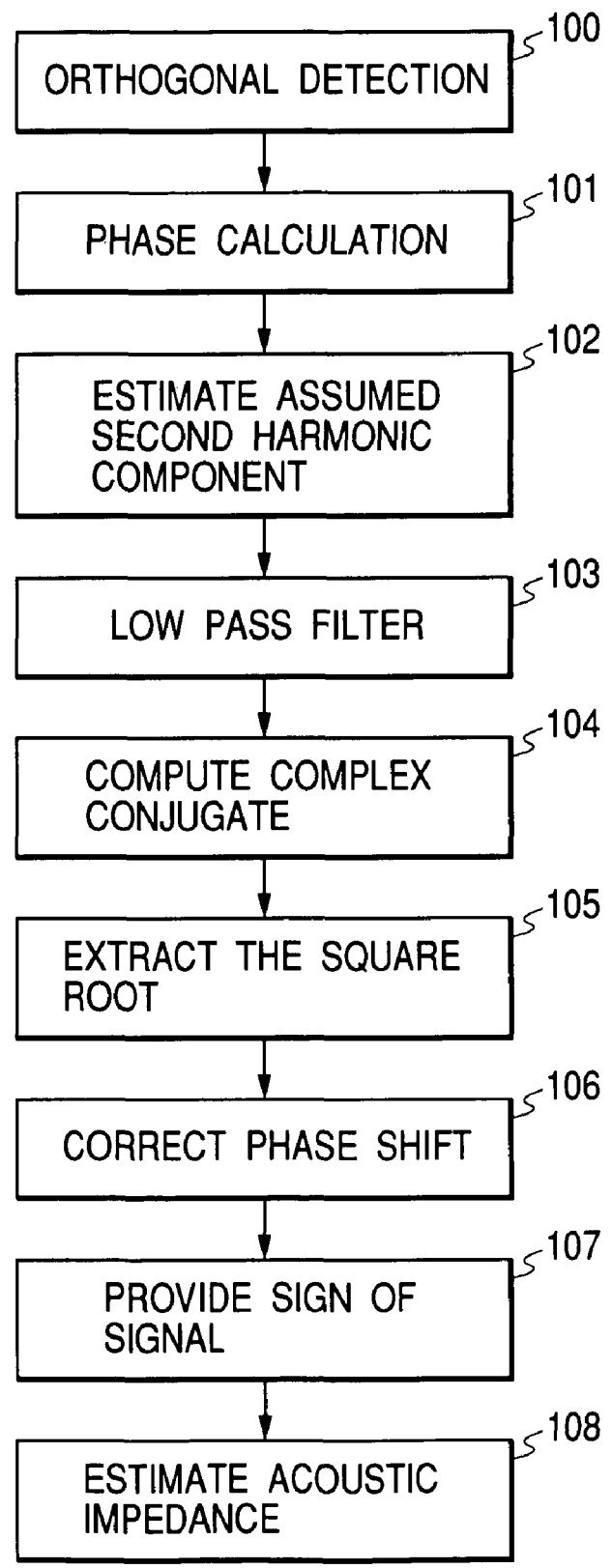
FIG. 5 is a diagram of assistance in explaining a signal processing process which assumes an imaginary harmonic wave to acquire an acoustic impedance image in Embodiment 1 of the present invention.

FIG. 5 is a diagram of assistance in explaining a signal processing process (signal processing process of an imaginary harmonic wave phase method) which assumes an imaginary harmonic wave to acquire an acoustic impedance image in Embodiment 1 of the present invention.

The processing shown in FIG. 5 is an example of correction of center frequency movement using a second harmonic wave: This is a method for tracking phase shift caused by a change in center frequency of a receive signal due to attenuation of a living body by processing considering an imaginary second harmonic wave after reception.

Orthogonal detection processing 100 of the complex beamformer 20 develops a receive signal to $c(t)\cos(\omega_0 t)+s(t)\sin(\omega_0 t)$.

Phase component operation processing 101 obtains a component to phase shift: $a(t)=\sqrt{c^2(t)+s^2(t)}$, $C(t)=c(t)/a(t)$, and $S(t)=s(t)/a(t)$.

Imaginary square component operation processing 102 obtains square signal $C_2(t)+jS_2(t)$ of complex signal $C(t)+jS(t)$ to real part $C(t)$ and imaginary part $S(t)$ of a detected signal.

Here, j is an imaginary number unit. $C_2(t)$ is derived from $C_2(t)=C^2(t)-S^2(t)$. $S_2(t)$ is derived from $S_2(t)=2C(t)S(t)$.

Preferably, low-pass filter processing 103 passes the complex square signal $C_2(t)+jS_2(t)$ through a low-pass filter (LPF) to remove abrupt change. The low-pass filter processing 103 obtains, as the output signal of the low-pass filter, $C_3(t)+jS_3(t)=LPF<C_2(t)+jS_2(t)>$.

Complex conjugate operation processing 104 obtains $C_3(t)-jS_3(t)$ (which can be omitted).

Square root extraction processing 105 obtains $C_4(t)=\pm\sqrt{((1+C_3(t))/2)}$ and $S_4(t)=sgn(-S_3C_4)\sqrt{((1-C_3(t))/2)}$. Using $C_4(t)$ and $S_4(t)$, echo phase shift correction processing 106 obtains $C_5(t)+jS_5(t)=(C(t)+jS(t))(C_4(t)+jS_4(t))$ to correct the phase of an echo.

Sign decision processing 107 notes an echo signal whose sign is known such as an echo signal in the lens and living body interface to decide the sign of $C_4$. Acoustic impedance decision processing 108 acquires an acoustic impedance image based on $C_5(t)$.

For correction of phase shift due to attenuation during propagation of an ultrasonic wave in a living body, the following method is reliable.

Figure 6:
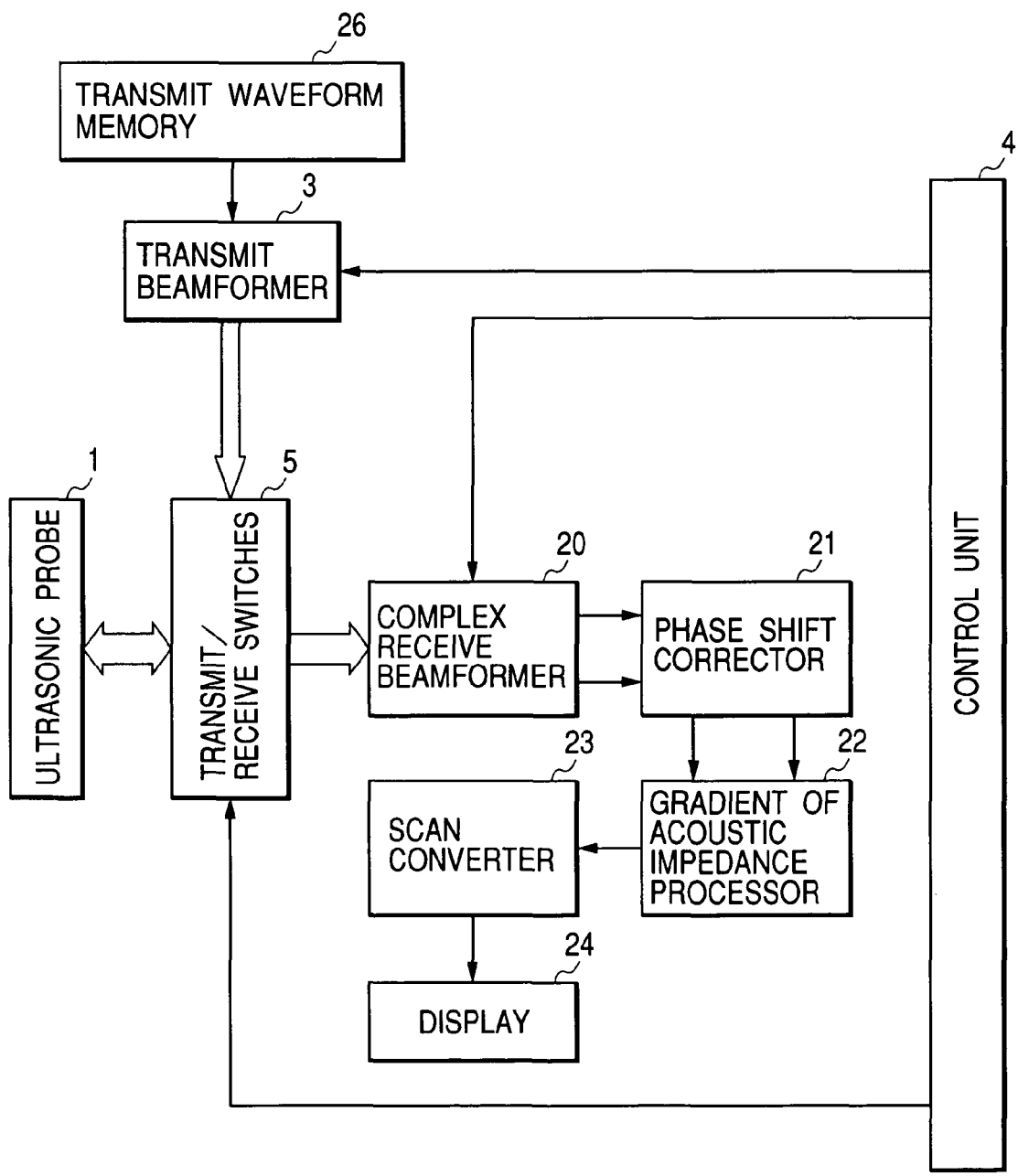
FIG. 6 is a diagram showing a construction example of an ultrasonic imaging system which superimposes a harmonic wave for transmission in Embodiment 1 of the present invention.

FIG. 6 is a diagram showing a construction example of an ultrasonic imaging system which superimposes a harmonic wave for transmission in Embodiment 1 of the present invention.

Figure 7:
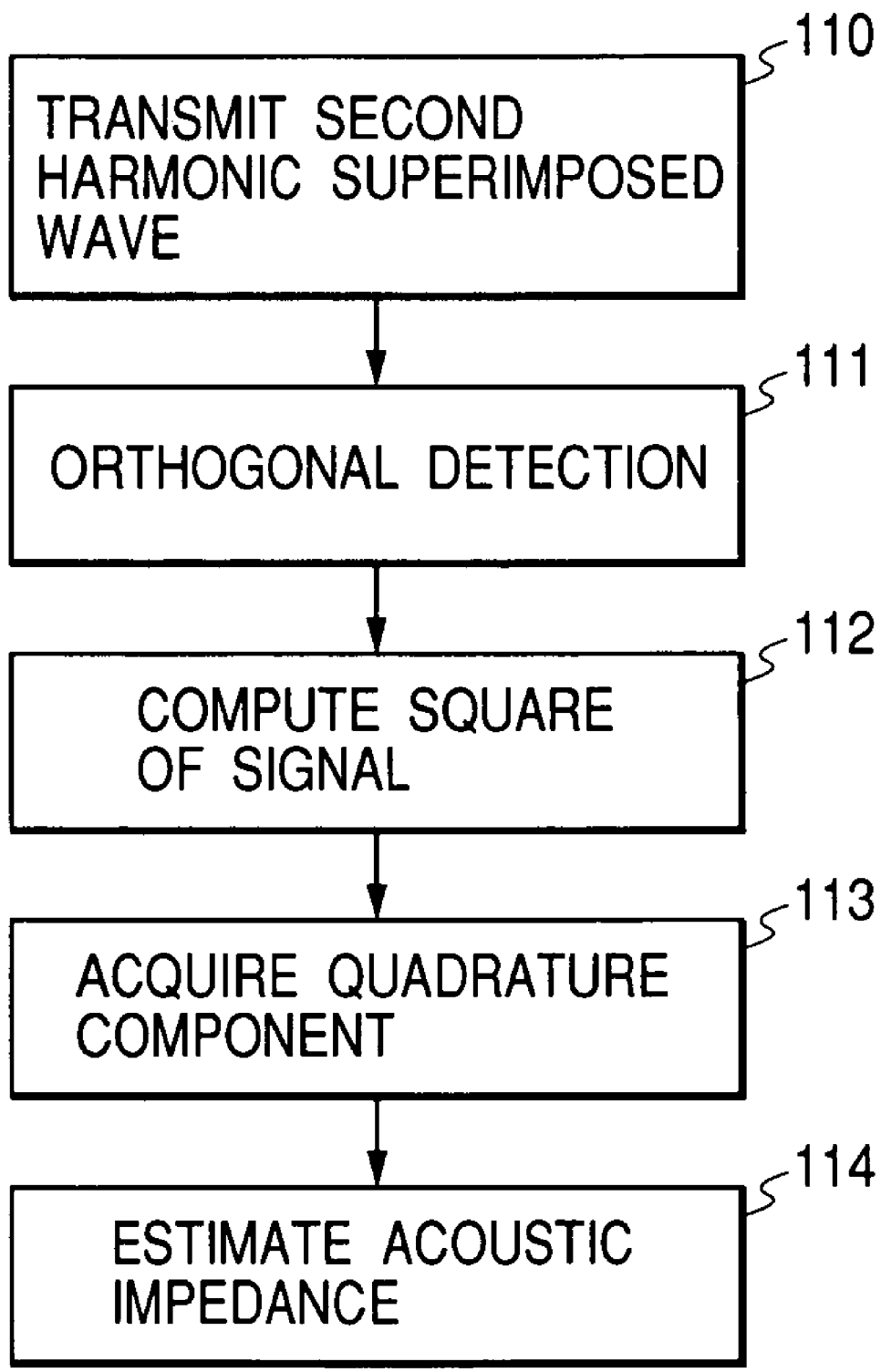
FIG. 7 is a diagram of assistance in explaining a signal processing process which superimposes a harmonic wave for transmission to acquire an acoustic impedance image in Embodiment 1 of the present invention.

FIG. 7 is a diagram of assistance in explaining a signal processing process (impedance imaging signal processing process of a real harmonic wave phase method) which superimposes a harmonic wave for transmission to acquire an acoustic impedance image in Embodiment of the present invention.

In the construction of the ultrasonic imaging system shown in FIG. 6, a transmit waveform (a second harmonic wave superimposed waveform) memory 26 is added to the construction of the ultrasonic imaging system shown in FIG. 1. In the construction of the ultrasonic imaging system shown in FIG. 6, the acoustic impedance change amount operation part 22 can be replaced by the acoustic impedance operation part 25. In the ultrasonic imaging system shown in FIG. 6, a harmonic wave is actually superimposed for transmission. In this case, a transmit signal is arbitrary to the phase of a second harmonic wave of a fundamental wave. The case that there is not the phase difference will be described below as an example (Actually, when the phase difference is decided, any phase difference may be used.).

Second harmonic wave superimposed transmit processing 110 superimposes a second harmonic wave for transmission, that is, transmits, as a transmit pulse signal, $s_1(t)\sin(\omega t)+s_2(t)\sin(2\omega t)$.

Orthogonal detection processing 111 orthogonally detects a receive signal to develop the receive signal to $C_1(t)\cos(\omega t)+S_1(t)\sin(\omega t)+C_2(t)\cos(2\omega t)+S_2(t)\sin(2\omega t)$.

Squaring processing 112 squares $C_1(t)+jS_1(t)$ to obtain, as a real part, $C_3=C_1^2(t)-S_1^2(t)$ and, as an imaginary part, $S_3=2C_1(t)S_1(t)$.

Orthogonal component extraction processing 113 obtains component $R(t)=(C_2(t)S_3(t)+S_2(t)C_3(t))/\sqrt{(C_3^2(t)+S_3^2(t))}$ orthogonal to $C_3(t)+jS_3(t)$ from the received second harmonic wave $C_2(t)+jS_2(t)$. Acoustic impedance decision processing 114 creates an acoustic impedance image based on $R(t)$.

When superimposing a high frequency for transmission, other than the processing method in a frequency space as described above, processing on time axis, that is, a method for detecting phase inversion by the correlation between a transmit waveform and a receive signal is effective. A waveform correlated with a receive signal may be gradually deformed corresponding to attenuation.

A method for correcting a beam diffraction effect will be described.

FIG. 8 is a diagram of assistance in explaining an ultrasonic pulse waveform and a point spread function in Embodiment 1 of the present invention.

An ultrasonic beam diffraction pattern of the current system and how it exerts an influence upon the phase of an ultrasonic echo will be described. In the current most ultrasonic diagnostic systems, PZT (lead zirconate titanate) is used for converting an electric signal to an ultrasonic wave and converting an ultrasonic wave to an electric signal. The sensitivity, that is, the efficiency converting an electric signal to an ultrasonic signal (which is equal to the efficiency converting an ultrasonic signal to an electric signal) is good. A homogenous material can be stably produced. Mechanical processing is performed relatively easily.

Figure 8A:
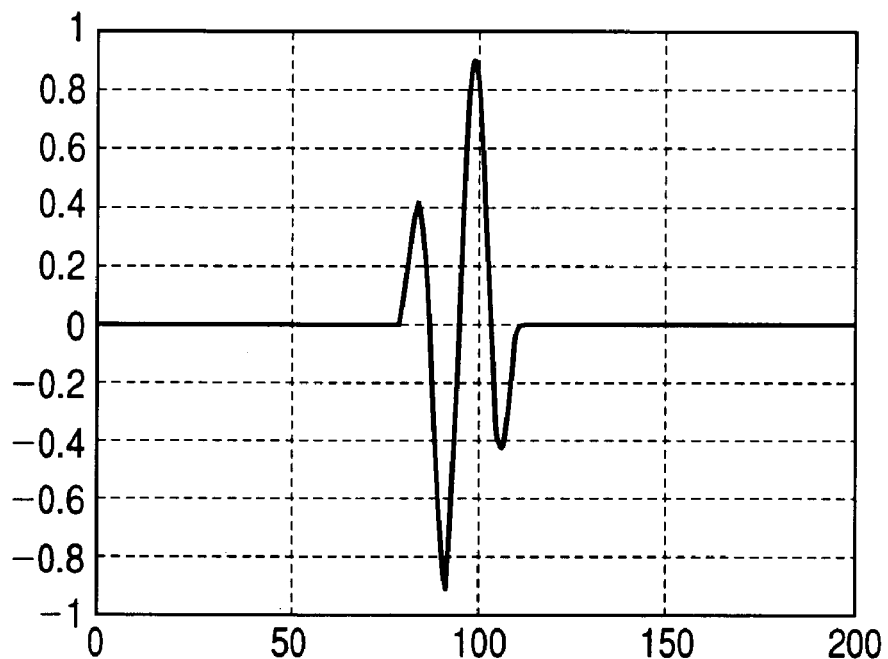
FIGS. 8A and 8B are diagrams of assistance in explaining an ultrasonic pulse waveform and a point spread function in Embodiment 1 of the present invention.

The sensitivity is good, but the efficiency converting an electric signal to an ultrasonic signal is about 60 to 80%. To use a pulse echo method, basically, a delta function pulse is preferably transmitted. To earn transmit energy as much as possible, a resonance phenomenon is used for electric excitation by the resonance frequency of PZT. An ultrasonic wave exiting therefrom is a sine wave pulse, as shown in FIG. 8A.

Figure 8B:
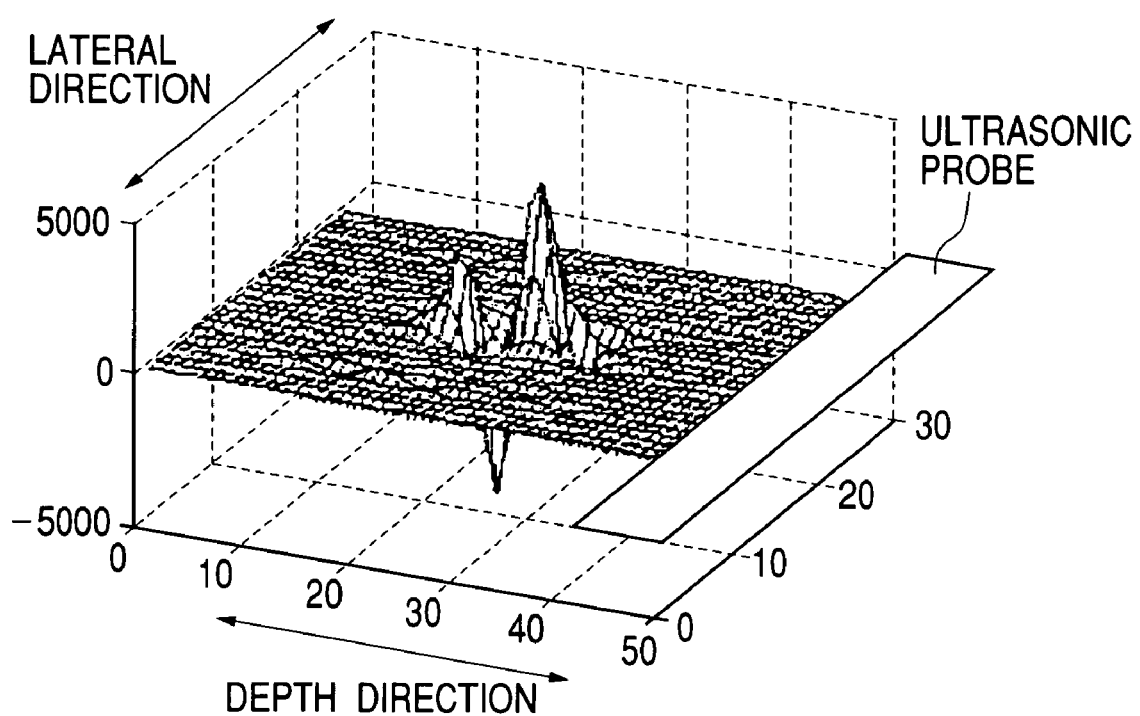

When such waveform is transmitted from the devices of an array, an acoustic field near a focal point is as shown in FIG. 8B. An ultrasonic tomographic image regards the acoustic field as a point spread function and can assume two-dimensional convolution of the point spread function and the echo source of a living body. When observing the shape of the point spread function shown in FIG. 8B, it is found that a carrier phase is shifted in the depth direction and at the same time, phase shift occurs in the lateral direction. The local carrier phase shift in the depth direction is removed in the output of the complex beamformer. Phase shift in the lateral direction gives incorrect information in phase imaging. When an echoing object is located in the position away from the focal point position of a transmit/receive aperture in the lateral direction, the phase is shifted according to the aberration amount to receive an echo.

To correct the effect, the present invention uses a least square filter using a method of least squares described below. A transmit waveform is B; a least square filter, f; and an output signal of the least square filter, c. The signal c after outputting of the least square filter is given by (Equation 1).

In the following description, symbol B indicates a matrix; c, f and d indicate a vector; and symbol "T" indicates transposition. d is a vector indicating a desired form as the output of the least square filter.

In (Equation 1), $f=(f1, f2, \ldots, fm)$, and B is a matrix of m row and (m+n−1) column in which the first row is (b1, b2, ..., bn, 0, ..., 0), the second row is (0, b1, b2, ..., bn, 0, ..., 0), ..., and the n row is (0, ..., 0, b1, b2, ..., bn). m is the number of taps (the number of elements) of the least square filter. n is the number of taps when a transmit waveform is sampled to be a vector.

$$c=fB \qquad (\text{Equation 1})$$

When a signal after passing through the least square filter is c and a desired waveform is d, error sum of squares l is given by (Equation 2). f minimizing the error sum of squares l is the least square filter. Addition Σ is performed for i=1, 2, ..., m+n−1.

$$1 = \sum (c_i - d_i)^2 = \quad \text{(Equation 2)}$$
$$(fB - d)(fB - d)^T = fBB^T f^T - dB^T f^T - fBd^T + dd^T$$

From the condition of (Equation 3), (Equation 4) is given. All i (i=1, 2, ..., m) are obtained from (Equation 4) to give (Equation 5). f is obtained by (Equation 6).

$$\frac{\partial 1}{\partial f_i} = 0 \quad \text{(Equation 3)}$$

$$\frac{\partial 1}{\partial f_i} = B_i B^T f^T + fBB_i^T - dB_i^T - B_i d^T \quad \text{(Equation 4)}$$
$$= 2(fBB_i^T - dB_i^T) = 0$$

$$\left(\frac{\partial 1}{\partial f_1}, \frac{\partial 1}{\partial f_2}, \ldots, \frac{\partial 1}{\partial f_m}\right)^T = fBB^T - dB^T = 0 \quad \text{(Equation 5)}$$

$$f = dB^T (BB^T)^{-1} \quad \text{(Equation 6)}$$

Such filter (least square filter) based on the method of least squares is designed. While holding the frequency band of a receive signal, a waveform can be changed. This can correct phase shift in the lateral direction of a beam. The band of a signal is not changed. When the band is changed to produce a signal to a band inherently having no signals and noise is included, the noise may be strengthened. It cannot be used in a system having real noise.

Figure 9A:
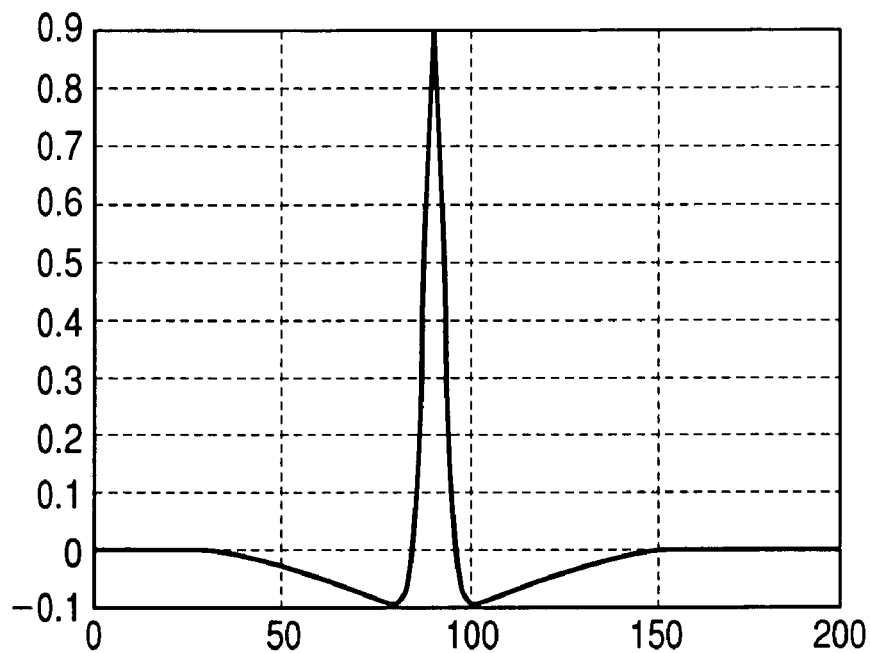
FIGS. 9A and 9B are diagrams of assistance in explaining an ultrasonic pulse waveform after passing through a least square filter and a point spread function after correcting phase shift in the lateral direction in Embodiment 1 of the present invention.
Figure 9B:
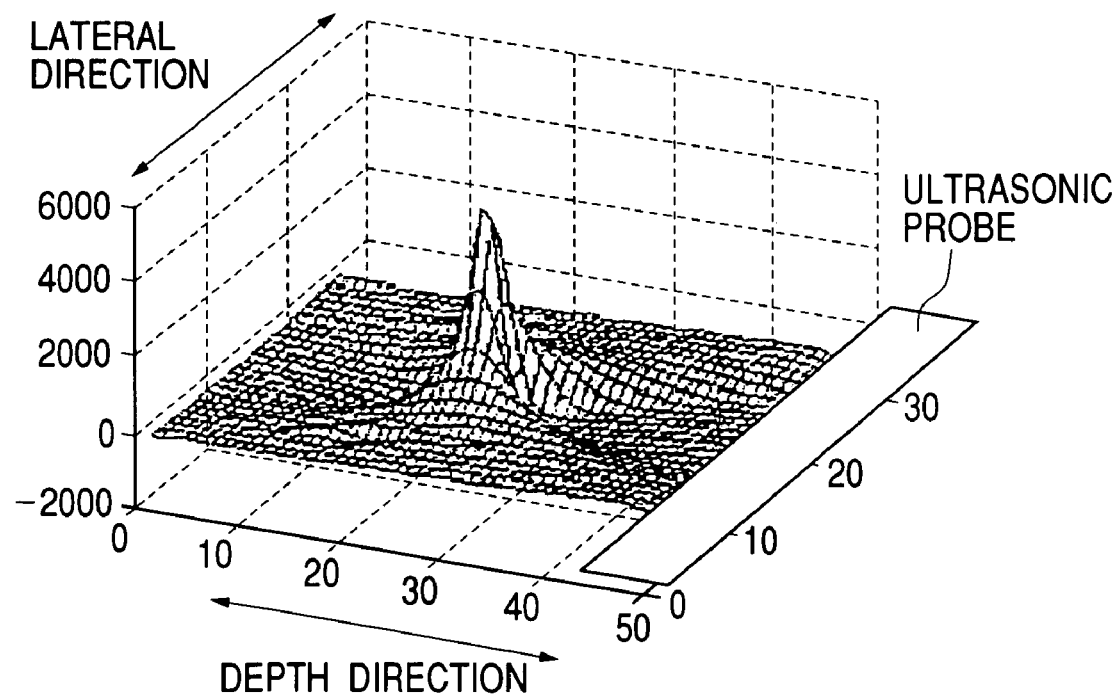

FIG. 9 is a diagram of assistance in explaining an ultrasonic pulse waveform after passing through the least square filter and a point spread function after correcting phase shift in the lateral direction in Embodiment 1 of the present invention. As shown in FIG. 9A, a derivative waveform of a Gaussian pulse having a band close to the upper limit and the lower limit of the band of a transmit pulse is used for desired waveform D as the output signal of the least square filter. FIG. 9B shows the result obtained by using the filter designed employing this to the point spread function shown in FIG. 8B. It is found that phase shift in the lateral direction disappears. A construction example of a system using this method is shown in FIG. 10.

Figure 10:
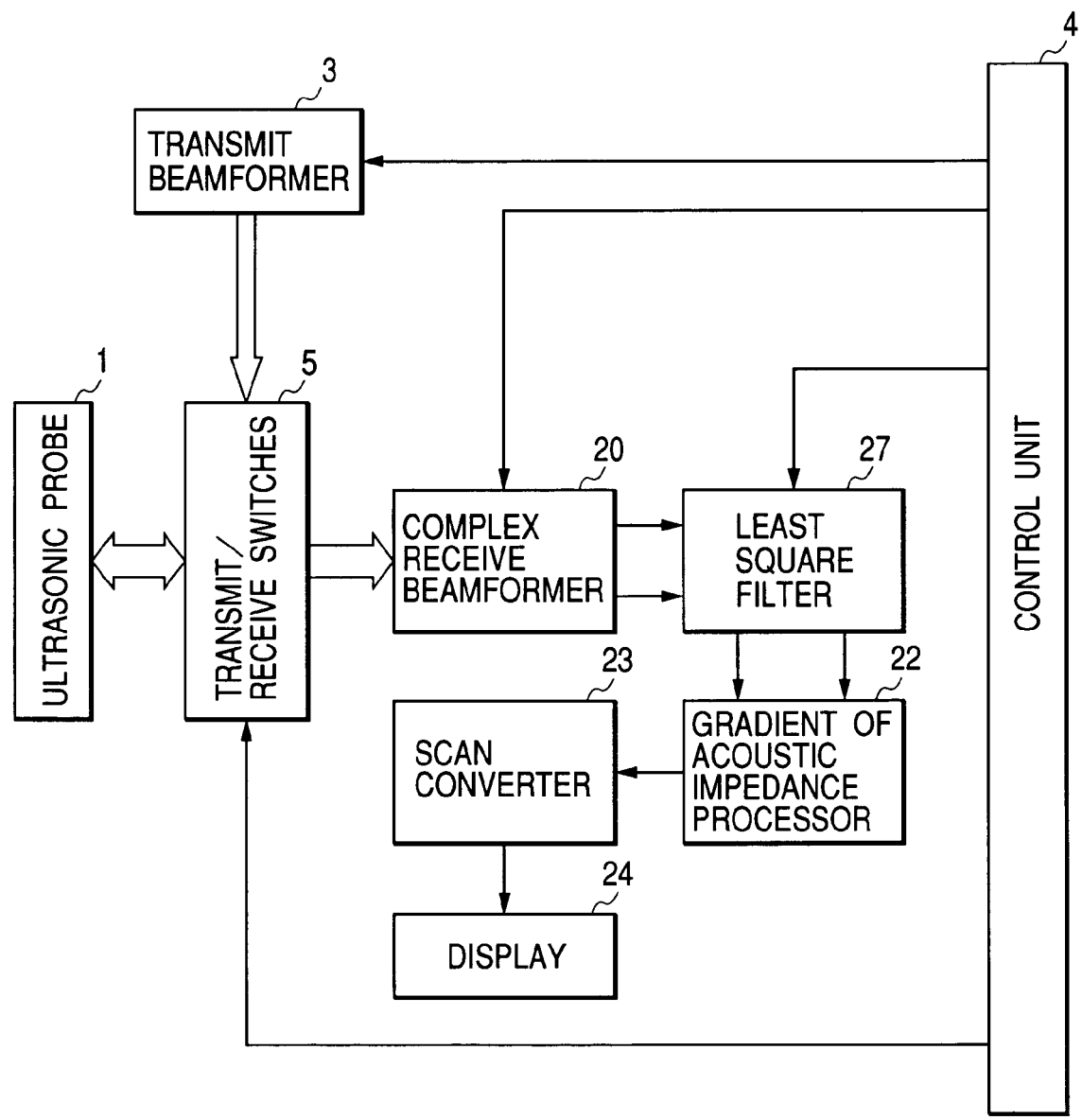
FIG. 10 is a diagram showing a construction example of an ultrasonic imaging system which corrects phase shift in the lateral direction in Embodiment 1 of the present invention.

FIG. 10 is a diagram showing a construction example of an ultrasonic imaging system which corrects phase shift in the lateral direction in Embodiment 1 of the present invention. The output signal of the complex receive beamformer 20 is inputted to a least square filter 27. An echoing object is in the position away from the focal point position of a transmit/receive aperture in the lateral direction. When the phase is shifted according to the aberration amount to receive an echo, phase shift in the lateral direction of the point spread function is corrected. The signal subject to phase shift correction is inputted to the acoustic impedance change amount operation part 22.

In the construction of the ultrasonic imaging system shown in FIG. 10, the acoustic impedance change amount operation part 22 can be replaced by the acoustic impedance operation part 25. In correction of phase shift in the lateral direction of the point spread function, the point spread function is changed according to the distance from the probe in an object range. The least square filter 27 is preferably constructed so as to change as the function of echo reception time.

In Embodiment 1, correction of phase shift due to frequency-dependent attenuation and correction of phase shift in the lateral direction are described. Actually, using the corrections at the same time is more preferable in more precise phase correction.

Embodiment 2

A method for enhancing and imaging a resonant object by applying phase correction according to the present invention will be described. When an object having a thickness to a traveling wave being half of a wavelength or a thickness odd number times that exists in a living body and an ultrasonic wave reaches the object, the object causes resonance. When the object causes resonance, it is known that the phase of a signal from the object is shifted. In the method of the present invention, when phase shift is corrected, the resonant state can be extracted for imaging. In this case, an input ultrasonic frequency is swept in ultrasonic spectroscopy so as to image the frequency response of the system.

Figure 12:
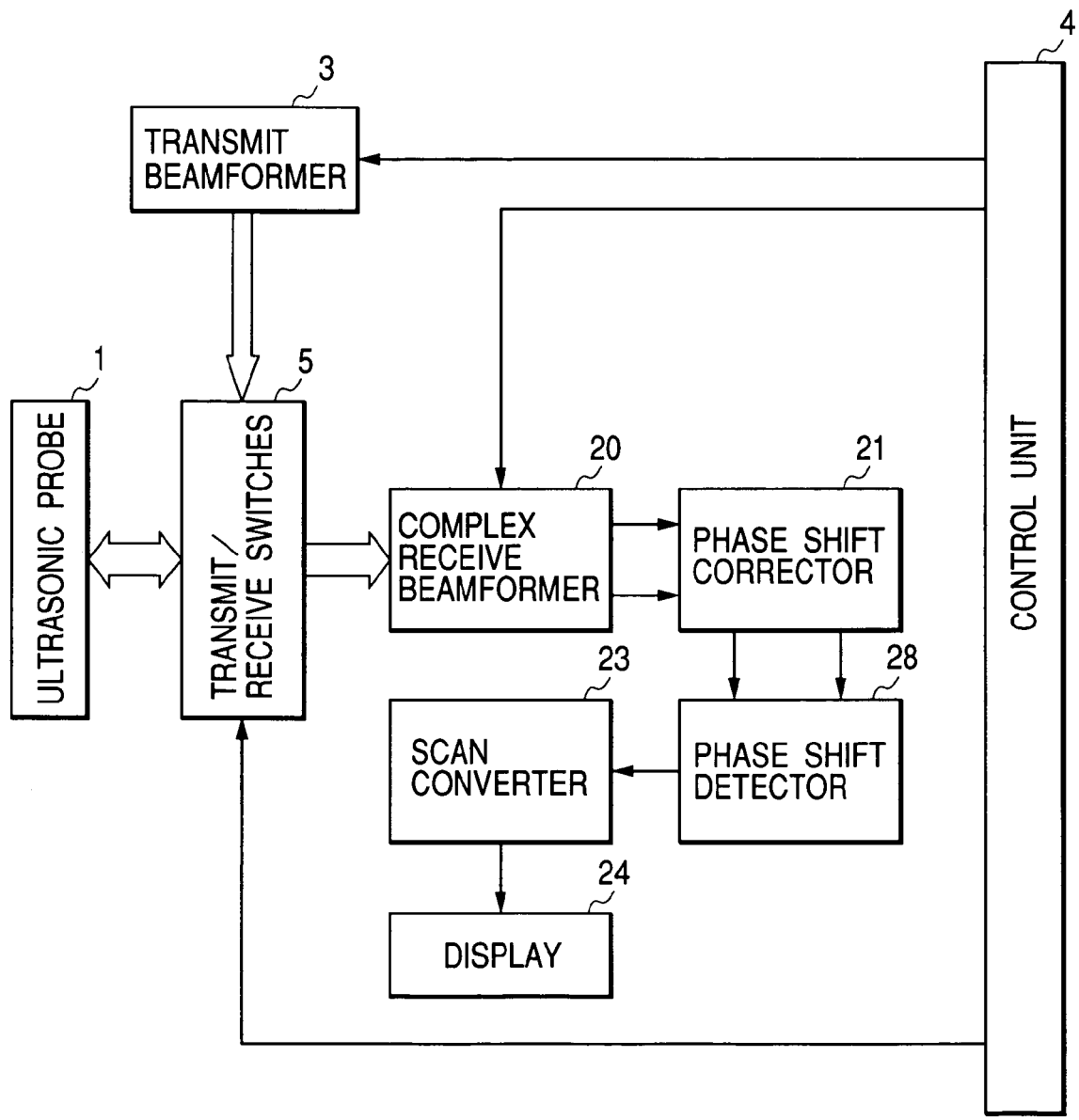
FIG. 12 is a diagram showing a construction example of an ultrasonic imaging system which extracts signals from a contrast agent in Embodiment 2 of the present invention.

FIG. 12 is a diagram showing a construction example of an ultrasonic imaging system which extracts a signal from a contrast agent in Embodiment 2 of the present invention. In the construction of the ultrasonic imaging system shown in FIG. 12, the acoustic impedance change amount operation part 22 in the construction of the ultrasonic imaging system shown in FIG. 1 is replaced by a phase shift extraction part 28 which extracts space change in a phase. The phase shift extraction part 28 uses the output signal of the phase shift correction part 21 to extract a space change in a phase. In particular, as a resonant system, imaging an ultrasonic contrast agent described below has been important recently.

In the present invention, phase shift of an echo signal from a living body can be obtained as meaningful information. It can be used for discriminating a signal from a contrast agent from a signal from the tissue of a living body. An echo signal from a living body, as described above, the phase of the echo signal is 0° or 180° at the interface changing from a soft part to a hard part or the reverse interface. In the case of a contrast agent, a more complex response is made to include all the phase components.

Figure 11:
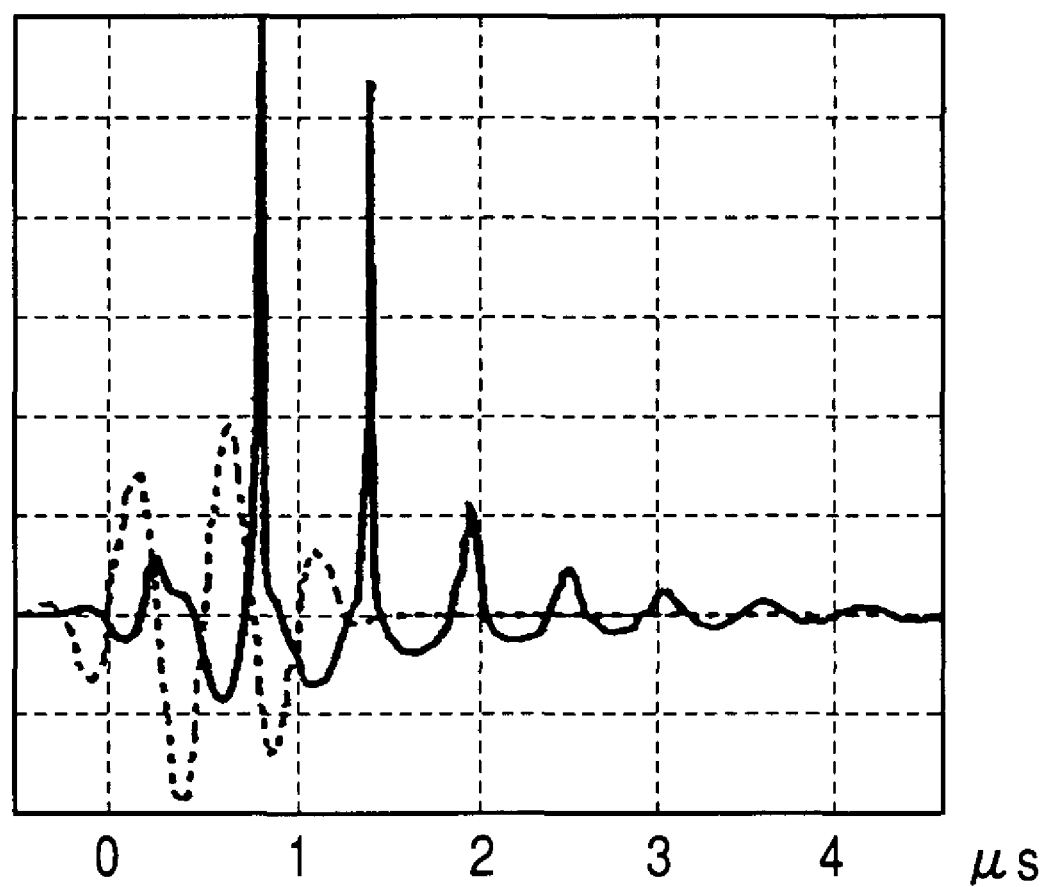
FIG. 11 is a diagram showing an example of results obtained by calculating a response of a contrast agent in Embodiment 2 of the present invention.

FIG. 11 is a diagram showing a simulation calculated result example of the response of a contrast agent (receive signal from the constant agent) by solving the Rayleigh-Plesset equation in Embodiment 2 of the present invention. As shown in FIG. 11, it is found that in the state of the response of a bubble indicated by the solid line to an excitation wave indicated by the dotted line, the frequency is shifted and the phase is also shifted. Without using the frequency change, a contrast between a signal from the contrast agent and a signal not from it, which have the same frequency, can be provided. Signals of phase other than 0° and 180° are extracted to extract only the signals from the contrast agent.

Figure 13:
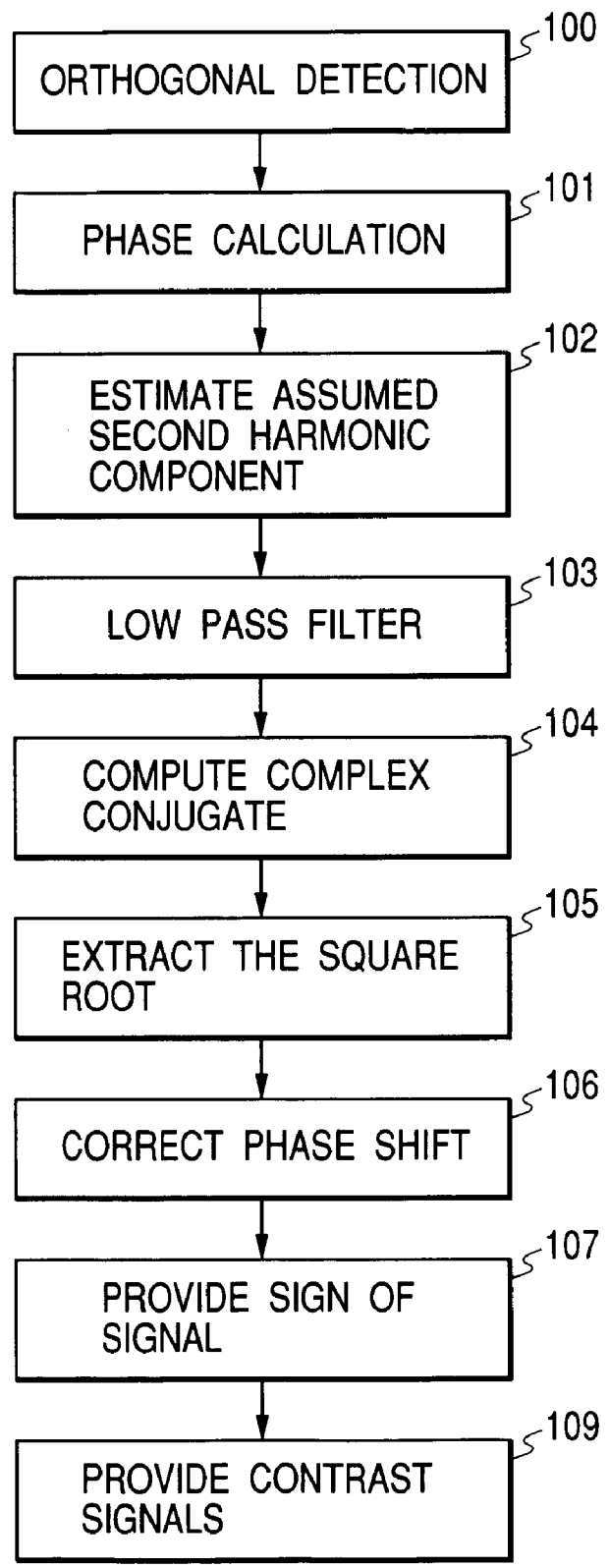
FIG. 13 is a diagram of assistance in explaining a signal processing process which assumes an imaginary harmonic wave to acquire a contrast agent map image in Embodiment 2 of the present invention.

FIG. 13 is a diagram of assistance in explaining a signal processing process (signal processing process of an imaginary harmonic wave phase method) which assumes an imaginary harmonic wave to acquire a contrast agent map image in Embodiment 2 of the present invention. The orthogonal detection processing 100, the phase component operation processing 101, the imaginary square component operation part 102, the low-pass filter processing 103, the complex conjugate operation processing 104, the square root extraction processing 105, the echo phase shift correction processing 106 and the code decision processing 107 of the signal processing process of FIG. 13 are the same as those of the signal processing process shown in FIG. 5.

In the signal processing process of FIG. 13, in place of the acoustic impedance decision processing 108 shown in FIG. 5, contrast agent signal extraction processing 109 acquires a contrast agent image based on S5(t).

Figure 14:
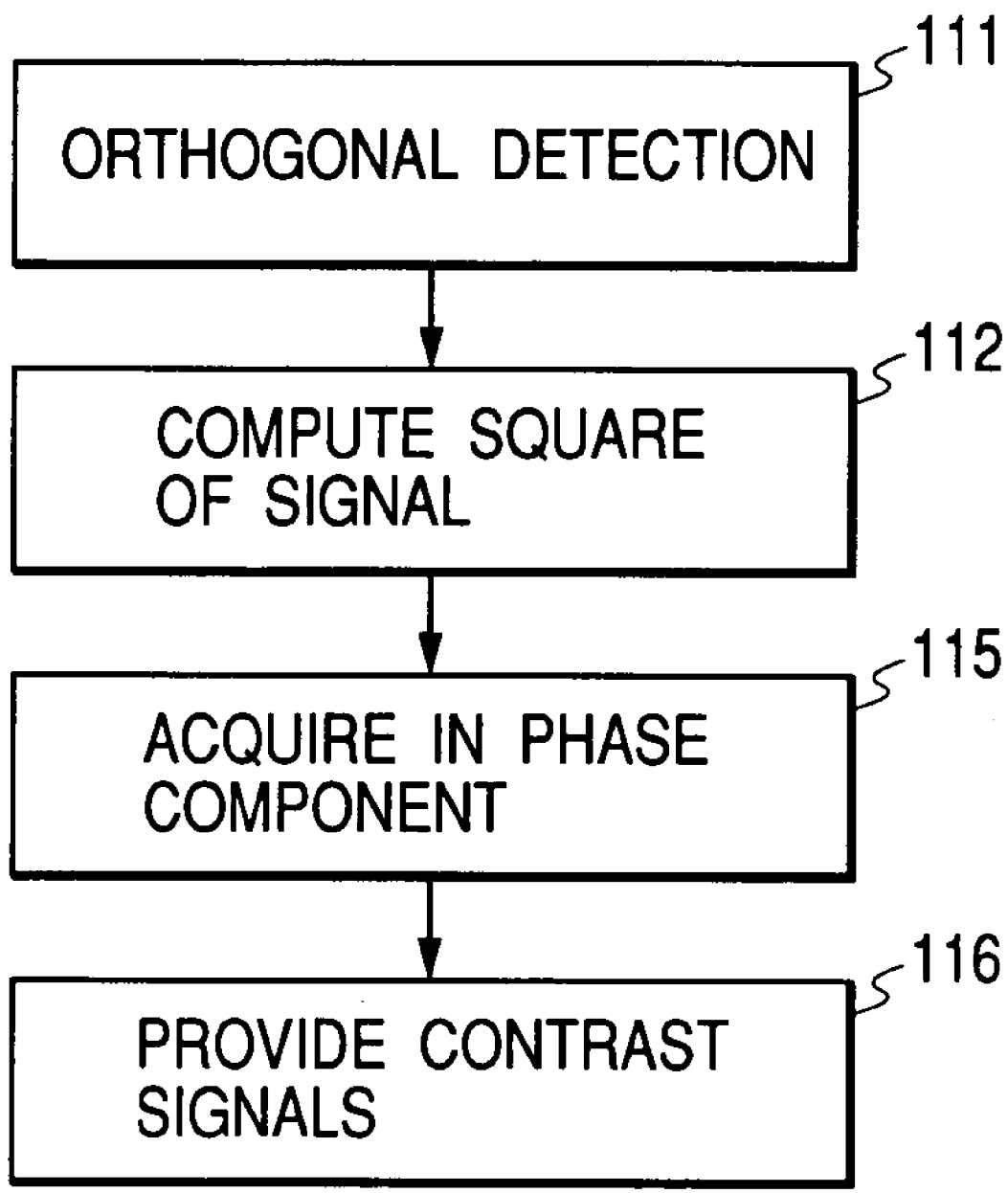
FIG. 14 is a diagram of assistance in explaining a signal processing process which superimposes a harmonic wave for transmission to acquire a contrast agent map image in Embodiment 2 of the present invention.

FIG. 14 is a diagram of assistance in explaining a signal processing process which superimposes a harmonic wave for transmission to acquire a contrast agent map image in Embodiment 2 of the present invention. The second harmonic wave superimposed transmit processing 110 (not shown in FIG. 14), the orthogonal detection processing 111 and the squaring processing 112 of the signal processing process of FIG. 14 are the same as those of the signal processing process shown in FIG. 7.

In the signal processing process of FIG. 14, in-phase component extraction processing 115 is performed in place of the orthogonal component extraction processing 113 shown in FIG. 7 and contrast agent signal extraction processing 116 is performed in place of the acoustic impedance decision processing 114. The in-phase component extraction processing 115 obtains component $R(t)=(C_2(t)C_3(t)-S_2(t)S_3(t))/\sqrt{(C_3^2(t)+S_3^2(t))}$ which is in-phase to $C_3(t)+jS_3(t)$ from the received second harmonic wave $C_2(t)+jS_2(t)$. The contrast agent signal extraction processing 116 makes a contrast agent map image based on R(t).

According to the method of the present invention, signals whose frequency is not changed can be used for contrast agent imaging. In the prior art contrast agent imaging, only signals whose frequency is changed are used and signals whose frequency is not changed are discarded. This corresponds to the fact that a large number of signals is most wasted. Using this method, it is possible to expect to improve the signal-to-noise ratio.

Embodiment 3

The present invention can be used for monitoring of a coagulation therapy by ultrasonic waves, as described below.

Figure 15:
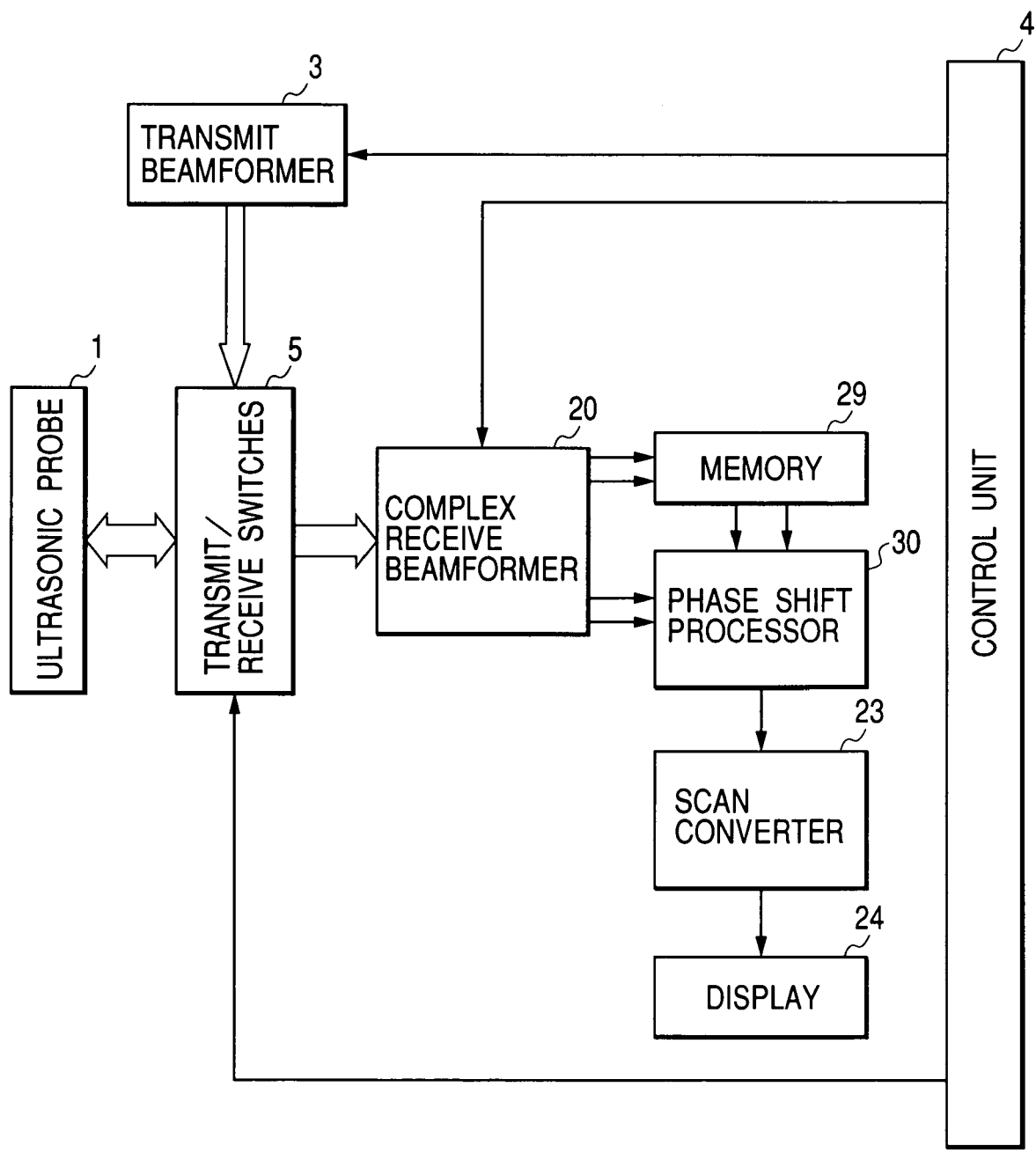
FIG. 15 is a diagram showing a construction example of an ultrasonic imaging system used for monitoring of a coagulation therapy in Embodiment 3 of the present invention.
Figure 16:
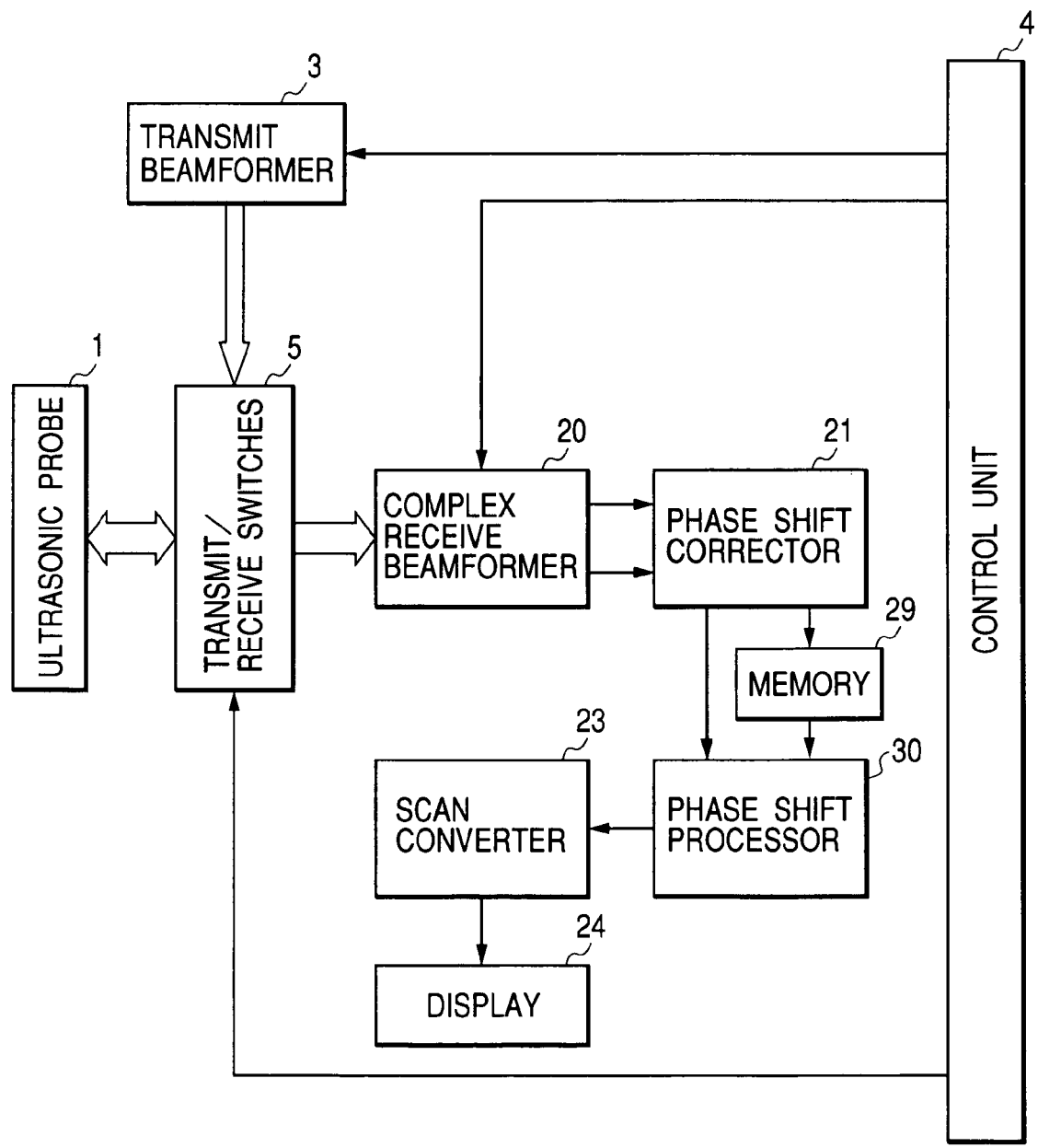
FIG. 16 is a diagram showing a construction example of an ultrasonic imaging system used for monitoring of a coagulation therapy in Embodiment 3 of the present invention.
Figure 17:
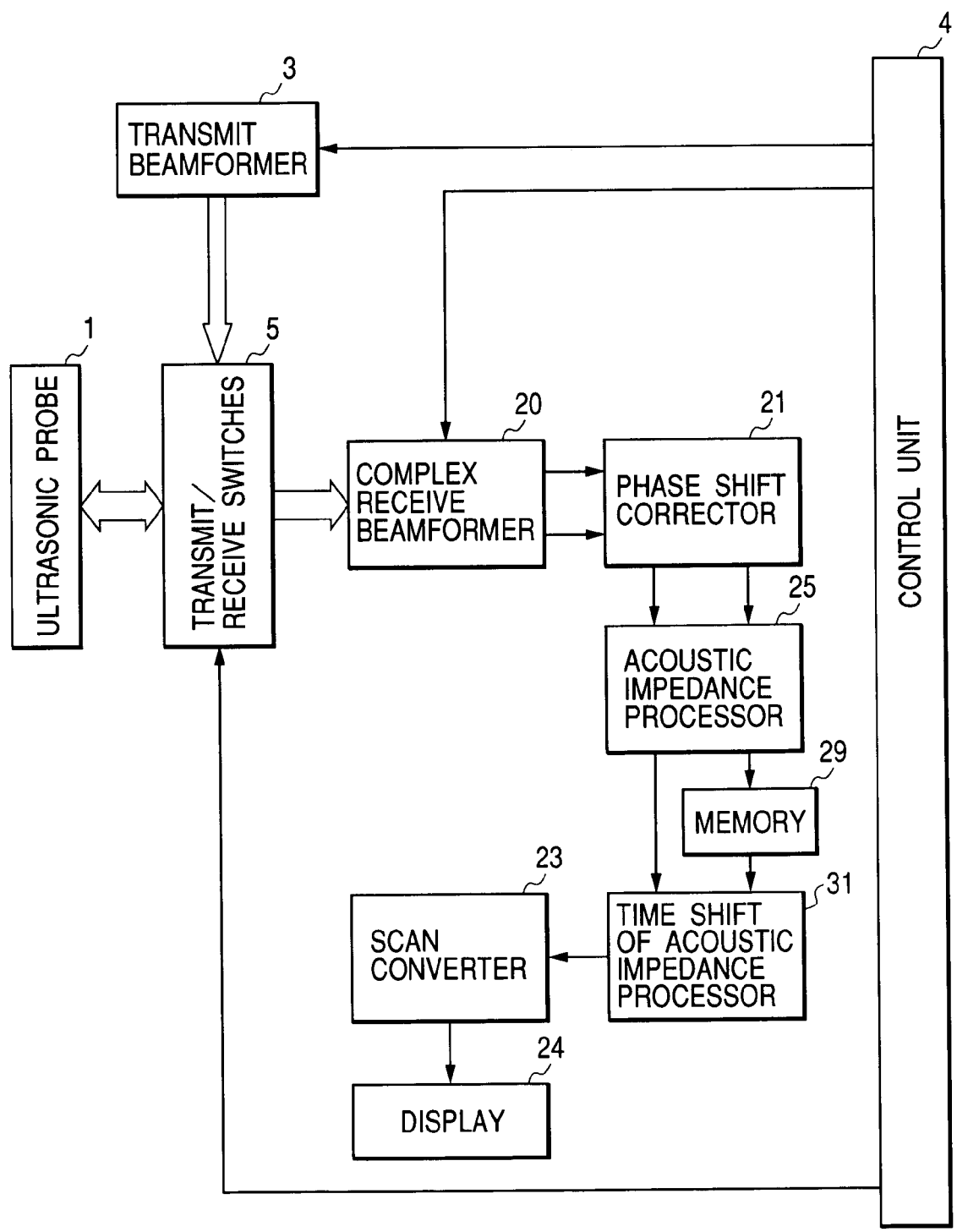
FIG. 17 is a diagram showing a construction example of an ultrasonic imaging system used for monitoring of a coagulation therapy in Embodiment 3 of the present invention.

FIGS. 15, 16 and 17 are diagrams showing a construction example of an ultrasonic imaging system used for monitoring of a coagulation therapy in Embodiment 3 of the present invention.

The construction of the ultrasonic imaging system shown in FIG. 15 has a memory 29 storing the output signals of the complex beamformer 20 before treatment for one image frame or an interested region; and a phase time change operation part 30, to which the output signal of the complex beamformer 20 is inputted, for operating phase time change. Other components shown in FIG. 15 are the same as those of FIG. 1.

In the construction of the ultrasonic imaging system shown in FIG. 16, the memory 29 and the phase time change operation part 30 are used in place of the acoustic impedance change amount operation part 22 in the construction of the ultrasonic imaging system shown in FIG. 1. The output signal of the phase shift correction part 21 is inputted to the phase time change operation part 30 and is stored into the memory 29. The signal stored into the memory 29 is read out to the phase time change operation part 30.

The construction of the ultrasonic imaging system shown in FIG. 17 has the acoustic impedance operation part 25, the memory 29, and an acoustic impedance time change operation part 31 operating time change in acoustic impedance. Other components shown in FIG. 17 are the same as those of FIG. 1. The output signal of the phase shift correction part 21 is inputted to the acoustic impedance operation part 25. The output signal of the acoustic impedance operation part 25 is inputted to the acoustic impedance time change operation part 31 and is stored into the memory 29. The signal stored into the memory 29 is read out to the acoustic impedance time change operation part 31.

As shown in FIGS. 15, 16 and 17, the output of the complex beamformer before treatment for one image frame or an interested region is stored into the memory. This is compared with the output of the complex beamformer during treatment so as to image phase shift of a treated part.

Detection of the change by treatment may be conducted after correcting phase shift, as shown in FIG. 16, or may be imaged as a time change in acoustic impedance after correcting phase shift, as shown in FIG. 17. The outputs of the complex beamformer are not compared before and after treatment, but are compared with a suitable screen during treatment. The influence of artifact by body motion during treatment or movement of the ultrasonic probe can be minimized.

Figure 18:
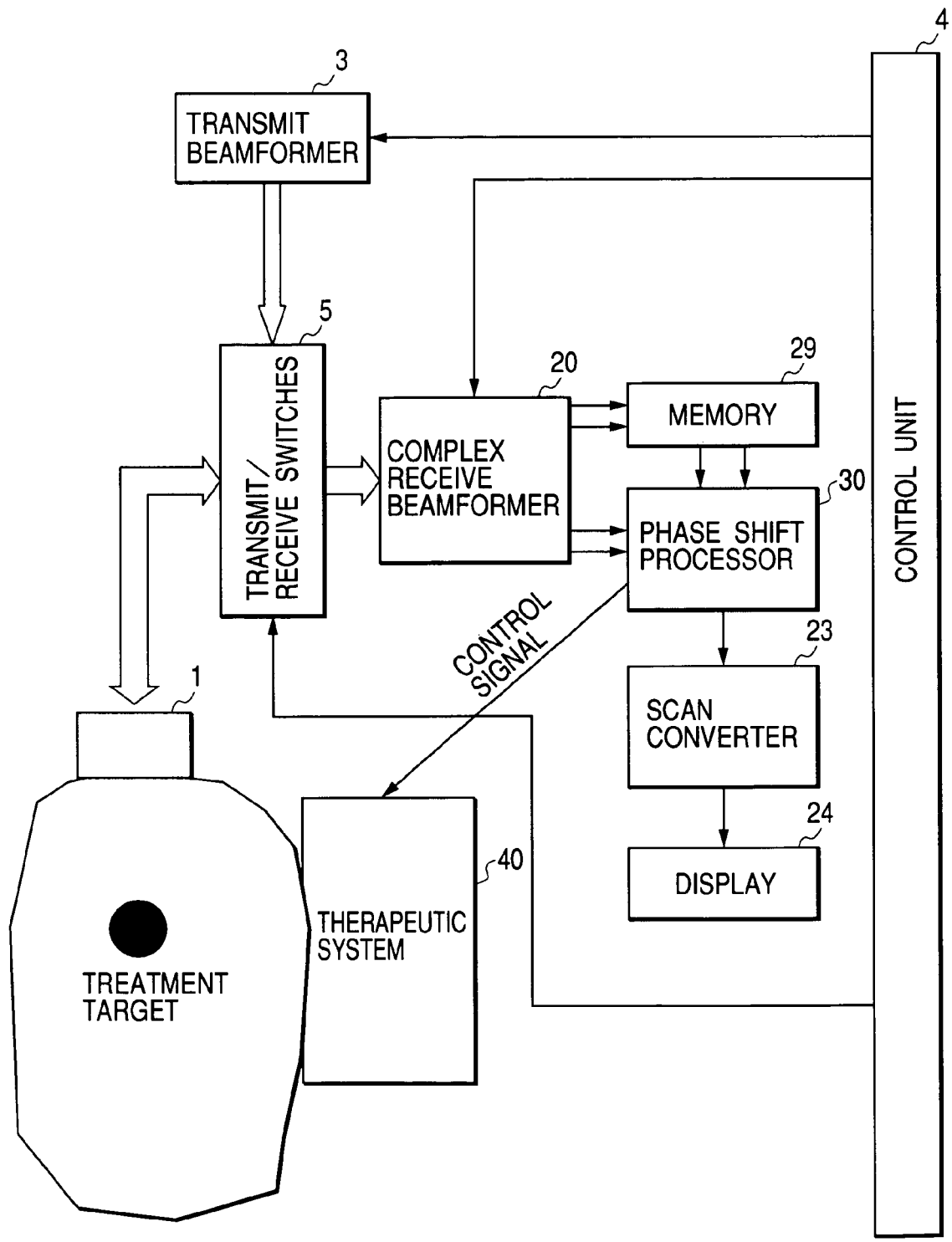
FIG. 18 is a diagram showing an example of a combination of a coagulation therapy system and an ultrasonic imaging system in Embodiment 3 of the present invention.

FIG. 18 is a diagram showing an example of a combination of a coagulation therapy system and the ultrasonic imaging system in Embodiment 3 of the present invention. In the example shown in FIG. 18, the ultrasonic imaging system shown in FIG. 5 is integrated with an ultrasonic treating system 40. The integration feeds back and uses a signal obtained in the phase time change operation part 30 as a control signal of the treating system 40. As a result, it is possible to provide a function automatically terminating treatment when its treating effect region is of a predetermined size decided before treatment.

Embodiment 4

In the present invention, an arbitrary phase component is displayed from a phase corrected complex receive signal to continuously change the image quality from a real part to an imaginary part.

Figure 19:
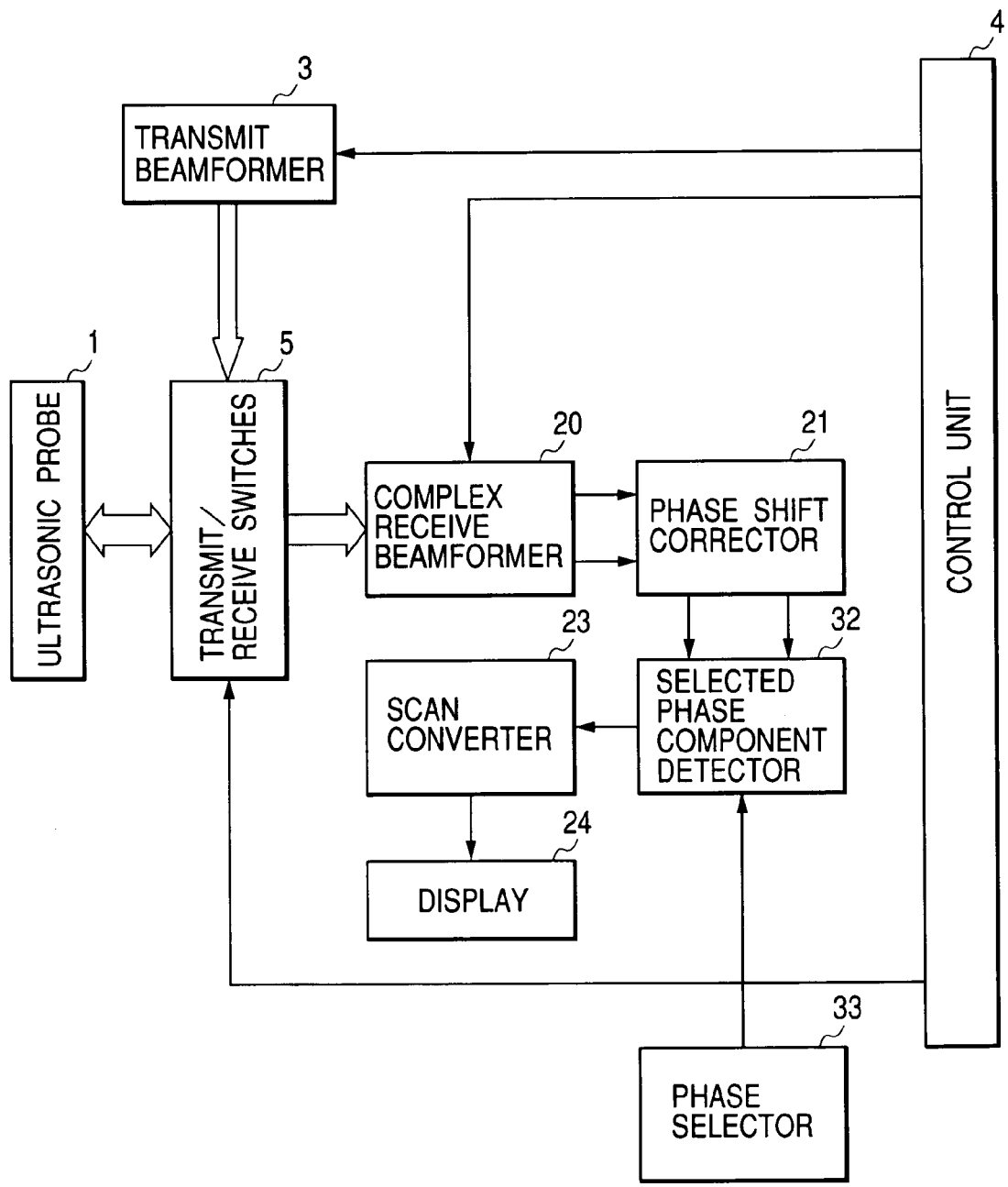
FIG. 19 is a diagram of assistance in explaining an example of Embodiment 4 of the present invention.

FIG. 19 shows the construction in which the acoustic impedance change amount operation part 22 in the construction of FIG. 1 is replaced by a specific phase component extraction part 32 and a phase component selection input part 33 is added. As shown in FIG. 19, the input part for inputting a phase selection range is provided in the body. A contrast agent can be enhanced for display. A space change in tissue characteristic such as acoustic impedance can be enhanced for display.

Figure 20:
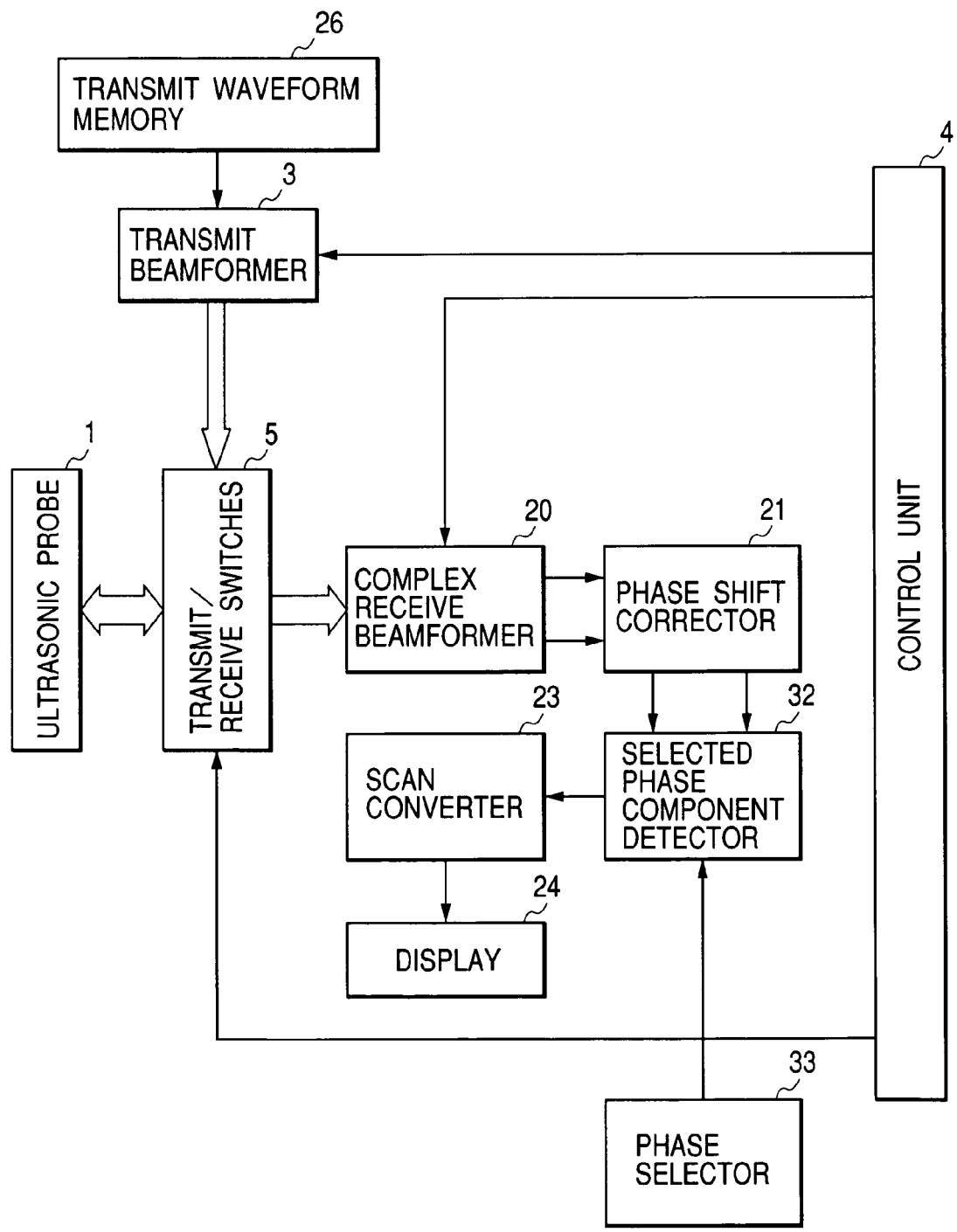
FIG. 20 is a diagram of assistance in explaining another example of Embodiment 4 of the present invention.

In this method, superimposing a second harmonic wave for transmission, as described above, is effective. The construction is as shown in FIG. 20. FIG. 20 shows the construction in which the acoustic impedance change amount operation part 22 in the construction of FIG. 6 is replaced by the specific phase component extraction part 32 and the phase component selection input part 33 is added.

As described in the above embodiments, the present invention can realize an ultrasonic imaging system and method which can correct a phase shift effect and image a real change in acoustic impedance in a living body.

In the acoustic impedance imaging, phase shift of frequency band movement of an echo and phase shift in the lateral direction of a beam are corrected. It is possible to realize an ultrasonic imaging system which displays phase shift of an echo signal due to a change in acoustic impedance in an object.

From the above-described phase shift calculation, the change in hardness of a tissue, a resonant part, a signal from a contrast agent and the change in hardness of a tissue by the coagulation therapy can be displayed.

The present invention is not limited to the above specific embodiments and various modifications can be made within the scope without departing from the scope of its technical idea.

The present invention can realize an ultrasonic imaging system and method which can correct a phase shift effect and image a real change in acoustic impedance in a living body.

What is claimed is:

1. An ultrasonic imaging system which transmits/receives an ultrasonic wave to/from an object using an ultrasonic probe to image said object, comprising: means for discriminating and detecting a phase aberration from a phase shift of a receive signal in a form of a reflected ultrasonic wave returned from said object based upon a transmit signal in a form of an ultrasonic wave transmitted to said object, the phase aberration being due to an acoustic impedance map in said object and due to other factors; means for transmitting a transmit signal superimposed on an even harmonic wave of a fundamental wave; means for using an orthogonal component of a received second harmonic wave to correct the phase aberration due to frequency-dependent attenuation caused in the process of propagation of the ultrasonic wave; and means for obtaining an acoustic impedance of said object from a complex signal in which the phase shift is corrected.

2. The ultrasonic imaging system according to claim 1, further comprising means for correcting the detected phase aberration of the receive signal.

3. The ultrasonic imaging system according to claim 1, further comprising means for displaying phase information due to the acoustic impedance map.

4. The ultrasonic imaging system according to claim 1, further comprising: means for orthogonally detecting the receive signal and expressing the detected receive signal as a complex signal; means for squaring the complex signal; a low-pass filter; means for correcting phase shift due to frequency-dependent attenuation based on the complex signal being passed through the low-pass filter; and means for obtaining the acoustic impedance map or the acoustic impedance of said object from the complex signal in which the phase shift is corrected.

5. An ultrasonic imaging system which transmits/receives an ultrasonic wave to/from an object using an ultrasonic probe to image said object, comprising: means for discriminating and detecting a phase aberration from a phase shift of a receive signal in a form of a reflected wave returned from said object based upon a transmit signal in a form of an ultrasonic wave transmitted to said object, the phase aberration being due to an acoustic impedance map in said object and other factors; and means for calculating a phase shift in a lateral direction of a point spread function decided by transmission/reception conditions of the ultrasonic wave; filtering processing means for minimizing the phase shift; means for correcting a phase aberration in the lateral direction of a beam of the ultrasonic wave caused by phase shift due to a diffraction effect; and means for obtaining acoustic impedance of said object from a complex signal in which the phase aberration is corrected.

6. The ultrasonic imaging system according to claim 5, wherein the filtering processing means is based on a method of least squares for minimizing the phase shift in the lateral direction of the point spread function; means for correcting the influence of the phase shift in the lateral direction to extract the acoustic impedance map in said object; and means for imaging the acoustic impedance map.

7. An ultrasonic imaging system which transmits/receives an ultrasonic wave to/from an object using an ultrasonic probe to image said object, comprising: means for correcting a phase aberration from a phase shift of a receive signal in a form of a reflected ultrasonic wave returned from said object based upon a transmit signal in a form of an ultrasonic wave transmitted to said object, the phase aberration being caused by phase shift due to frequency dependent attenuation and/or phase shift due to a diffraction effect; means for extracting or enhancing a phase shift of a resonant object in said object; and means for performing imaging which reflects spectroscopy in a resonant state by changing a transmit frequency of the ultrasonic wave.

8. The ultrasonic imaging system according to claim 7, wherein the means for extracting or enhancing the phase shift extracts or enhances a phase shift of an ultrasonic contrast agent in said object.

9. The ultrasonic imaging system according to claim 8, further comprising: means for orthogonally detecting the receive signal and expressing the detected receive signal as a complex signal; means for squaring the complex signal; a low-pass filter; means for correcting the phase shift due to frequency-dependent attenuation based on the complex signal being passed through the low-pass filter; and means for obtaining position, amount, and moving speed of the ultrasonic constant agent in said object from a phase shift part of the complex signal remaining after correcting the phase shift.

10. The ultrasonic imaging system according to claim 8, further comprising: means for transmitting a transmit signal superimposed on a second harmonic wave of a fundamental wave and for utilizing a received second harmonic wave having an in-phase component to the phase of the transmit signal to isolate a phase shift caused in the process of propagation of the ultrasonic wave from the phase shift in accordance with existence of the ultrasonic contrast agent; and means for obtaining position, amount, and moving speed of the ultrasonic constant agent in said object.

11. The ultrasonic imaging system according to claim 8, further comprising: means for calculating a phase shift in a lateral direction of a point spread function decided by transmission/reception conditions, filtering processing means for minimizing the phase shift so as to correct a phase aberration in the lateral direction of a beam of the ultrasonic wave caused by phase shift due to a diffraction effect, and for isolating phase shift caused by diffraction of the beam of the ultrasonic wave from phase shift due to the existence of the ultrasonic contrast agent; and means for obtaining position, amount, and moving speed of the ultrasonic constant agent in said object, wherein the filtering processing means performs filtering processing based on a method of least squares.

12. An ultrasonic imaging system which transmits/receives an ultrasonic wave to/from an object using an ultrasonic probe to image said object, comprising: means for detecting a phase aberration from a phase shift of a receive signal in a form of a reflected ultrasonic wave returned from said object based upon a transmit signal in a form of an ultrasonic wave, the phase aberration being due to discontinuity of acoustic impedance of said object transmitted to said object; and means for obtaining a time change in the acoustic impedance of said object and for displaying the time change in the acoustic impedance.

13. A treating system comprising: an ultrasonic imaging system according to claim 12; and means for feeding back to the treating system the time change in acoustic impedance obtained from the ultrasonic imaging system which is discontinuous.

14. The ultrasonic imaging system according to claim 12, wherein said the means for detecting detects the phase aberration of the receive signal due to the discontinuity of acoustic impedance in said object by discrimination from phase aberration of the receive signal due to other factors.

15. The ultrasonic imaging system according to claim 12, wherein the means for obtaining a time change in the acoustic impedance of said object detects information about a space position of the acoustic impedance by detecting the phase shift of the receive signal.

16. An ultrasonic imaging system which transmits/receives an ultrasonic wave to/from an object using an ultrasonic probe to image said object, comprising: means for transmitting a transmit signal in a form of an ultrasonic wave to said object; means for orthogonally detecting a receive signal in a form of reflected ultrasonic wave returned from said object; means for obtaining a component corresponding to a phase shift from the orthogonally detected receive signal; a low-pass filter for removing an abrupt change from the component corresponding to the phase shift; means for using the output signal of the low-pass filter to correct a phase aberration in a lateral direction of a beam of the ultrasonic wave caused by phase shift due to frequency-dependent attenuation and/or phase shift due to a diffraction effect; input means for selecting a phase shift to be displayed; and means for extracting or enhancing for display the phase shift selected by the input means or a signal in the range of the phase shift.

17. An ultrasonic imaging system which transmits/receives an ultrasonic wave to/from an object using an ultrasonic probe to image said object, comprising: means for transmitting a transmit signal superimposed on an even harmonic wave of a fundamental wave to said object; means for orthogonally detecting a receive signal returned from said object; means for inputting a specific phase component to said even harmonic wave from the orthogonally detected receive signal; and means for extracting or enhancing a signal of a phase component in the range selected by the input means; and means for displaying the extracted or enhanced signal.

18. An ultrasonic imaging method which transmits/receives an ultrasonic wave to/from an object using an ultrasonic probe to image said object, comprising the steps of: transmitting a transmit signal in a form of an ultrasonic wave to said object; receiving a receive signal in a form of a reflected ultrasonic wave returned from said object and correcting a phase aberration in a lateral direction of a beam of the ultrasonic wave caused by a phase shift of the receive signal due to frequency-dependent attenuation and/or phase shift due to a diffraction effect; acquiring an acoustic impedance image of said object from the corrected receive signal and/or a derivative image about a space position of the acoustic impedance; and displaying the acoustic impedance image and/or the derivative image.

19. An ultrasonic imaging method which transmits/receives an ultrasonic wave to/from an object using an ultrasonic probe to image said object, comprising the steps of: transmitting a transmit signal in a form of an ultrasonic wave to said object; orthogonally detecting a receive signal in a form of a reflected ultrasonic wave returned from said object; obtaining a component corresponding to a phase shift from the orthogonally detected receive signal; removing an abrupt change from the component corresponding to the phase shift by using a low-pass filter; using the output signal of the low-pass filter to correct a phase aberration in a lateral direction of a beam of the ultrasonic wave caused by phase shift due to frequency-dependent attenuation and/or phase shift due to a diffraction effect; obtaining, based on the receive signal in which the phase is corrected, an acoustic impedance image of said object and/or a derivative image about a space position of the acoustic impedance; and displaying the acoustic impedance image and/or the derivative image.

20. The ultrasonic imaging method according to claim 19, wherein the acoustic impedance is based on a contrast agent injected to said object.

21. An ultrasonic imaging method which transmits/receives an ultrasonic wave to/from an object using an ultrasonic probe to image said object, comprising the steps of: transmitting a transmit signal superimposed on an even harmonic wave of a fundamental wave to said object; orthogonally detecting a receive signal returned from said object to extract an orthogonal component of said even harmonic wave from said orthogonally detected receive signal; acquiring an acoustic impedance image of said object and/or said derivative image based on said extracted orthogonal component; and displaying said acoustic impedance image and/or said derivative image.

22. The ultrasonic imaging method according to claim 21, wherein said acoustic impedance is based on a contrast agent injected to said object.

23. An ultrasonic imaging method which transmits/receives an ultrasonic wave to/from an object using an ultrasonic probe to image said object, comprising the steps of: transmitting a transmit signal superimposed on an even harmonic wave of a fundamental wave to said object; orthogonally detecting a receive signal returned from said object to extract an in-phase component of said even harmonic wave from said orthogonally detected receive signal; acquiring an acoustic impedance image of said object and/or said derivative image based on said extracted in-phase component; and displaying said acoustic impedance image and/or said derivative image.

24. The ultrasonic imaging method according to claim 23, wherein said acoustic impedance is based on a contrast agent injected to said object.

* * * * *